United States Patent [19]
Kai et al.

[11] Patent Number: 5,687,399
[45] Date of Patent: Nov. 11, 1997

[54] IMAGE-SHAKE CORRECTING APPARATUS

[75] Inventors: Tadao Kai, Kawasaki; Susumu Sato, Chiba; Nobuhiko Terui, Ichikawa, all of Japan

[73] Assignee: Nikon Corporation, Tokyo, Japan

[21] Appl. No.: 704,353

[22] Filed: Aug. 29, 1996

Related U.S. Application Data

[63] Continuation of Ser. No. 530,730, Sep. 19, 1995, abandoned, which is a continuation of Ser. No. 252,957, May 23, 1994, abandoned, which is a continuation of Ser. No. 90,573, Jul. 12, 1993, abandoned.

[30] Foreign Application Priority Data

Jul. 15, 1992 [JP] Japan .................................. 4-187199
Oct. 2, 1992 [JP] Japan .................................. 4-287133

[51] Int. Cl.⁶ .................................................. G03B 17/00
[52] U.S. Cl. .................................................. 396/55
[58] Field of Search .................................. 396/52–55

[56] References Cited

U.S. PATENT DOCUMENTS

| | | | |
|---|---|---|---|
| 4,965,619 | 10/1990 | Shikaumi et al. | 354/430 X |
| 4,978,205 | 12/1990 | Sato | 350/423 |
| 5,117,246 | 5/1992 | Takahashi et al. | 354/202 |
| 5,138,354 | 8/1992 | Okada et al. | 354/219 |
| 5,155,520 | 10/1992 | Nagasaki et al. | 354/430 |
| 5,231,445 | 7/1993 | Onuki et al. | 354/430 X |

FOREIGN PATENT DOCUMENTS

| | | |
|---|---|---|
| 2-66535 | 3/1990 | Japan . |
| 2-183217 | 7/1990 | Japan . |
| 2-234115 | 9/1990 | Japan . |

OTHER PUBLICATIONS

English Abstract of JP-A-4020941, Jan. 24, 1992.
English Abstract of JP-A-2301732, Dec. 13, 1990.
English Abstract of JP-A-2082112, Mar. 22, 1990.
English Abstract of JP-A-4020942, Jan. 24, 1992.

*Primary Examiner*—Russell E. Adams
*Attorney, Agent, or Firm*—Shapiro and Shapiro

[57] ABSTRACT

An image-shake correcting photographic apparatus comprises a photographic optical system, an image-shake correcting device comprised of an element which is a constituent of the photographic optical system, a condition output device for detecting a condition of the photographic optical system upon photography and generating an output related to the condition detected, a shake detecting device for detecting shakes of the photographic apparatus and generating an output related to the shakes detected, and a drive control device for drive-controlling the image-shake correcting device, based on the output of the condition output device and the output of the shake detecting device.

87 Claims, 16 Drawing Sheets

IMAGE-SHAKE CORRECTING APPARATUS

This is a continuation of application Ser. No. 08/530,730 filed Sep. 19, 1995, which is a continuation of application Ser. No. 08/252,957 filed May 23, 1994, which is a continuation of application Ser. No. 08/090,573 filed Jul. 12, 1993, all now abandoned.

BACKGROUND OF THE INVENTION

1. Field of the Invention

The present invention relates to a photographic apparatus which can correct image shakes upon shooting.

2. Related Background Art

There are known image-shake correcting photographic apparatus which can detect an angular change of optical axis caused by hand shakes on the photographic apparatus such as cameras and correct a photographic image by the detected change, for example as disclosed in Japanese Laid-open Patent Application No. 2-66535 (which is an example of single lens optical system) or in Japanese Laid-open Patent Application No. 2-183217 (which is an example of image correction by shifting a part of photographic optical system in internal focusing telephotographic lens).

The structure of photographic optical system is described for example in Japanese Laid-open Patent Application No. 2-234115 filed by Applicant.

The technology of image-shake correction is most necessary for camera with telephotographic lens, the majority of which is of internal focusing lens.

The internal focusing lens, however, changes its focal length (f) gradually from upon infinity photography to upon nearest photography.

Then, an error would be caused if the image-shake correction is effected only by a drive control using a simple operation expression of image-shake amount as disclosed in Japanese Laid-open Patent Application No. 2-66535.

Further, an optical lens thickness (distance HH' between principal planes) also varies, which makes it difficult to obtain the distances "a" and "b" in the above application simply from a photographic distance of subject.

Zoom lenses also include the same problems of the focal length change and the lens thickness change.

Further, in such photographic apparatus, it is possible to calculate a more accurate image-shake amount by determining a position of rotation center on the optical axis of apparatus and removing image shakes caused by rotation of photographic apparatus by using determined position so that the influence of movement of the above rotation center position and the incidence portion of photographic lens may be eliminated.

However, in a photographic apparatus, for example in an interchangeable lens camera, the rotation center position changes along the optical axis of photographic apparatus, depending upon a combination of lens barrel with camera body.

Accordingly, calculation of accurate image-shake amount was impossible in such interchangeable lens photographic apparatus, and some means to solve such problem has been in demand.

SUMMARY OF THE INVENTION

It is an object of the present invention to provide an apparatus having detecting means for detecting an angular change to effect more accurate correction of image shakes.

It is another object of the present invention to provide an image-shake correcting photographic apparatus provided with detecting means for detecting an angular change, which can perform more accurate image-shake correction even with any combination of lens barrel with camera body.

An image-shake correcting photographic apparatus according to the present invention comprises image pickup means, a photographic optical system, a correction drive portion for shifting a partial element of the optical system (correction system) relative to a screen to correct image shakes, angle change detecting means for detecting an angle change of optical axis of the photographic apparatus, condition detecting means for detecting a condition of the optical system, and a correction drive control portion for controlling a drive of the correction drive portion in accordance with an output of the angle change detecting means and an output of the condition detecting means.

In an embodiment, the image-shake correcting photographic apparatus further comprises first factor generating means for generating an output of a distance between a rear principal plane H' of the photographic optical system and an image plane (which will be referred to as b) in accordance with the output of the condition detecting means, second factor generating means for generating an output of a distance between a photographic object and a front principal plane H of the photographic optical system (as will be referred to as a) in accordance with the output of the condition detecting means, and photographic distance output generating means for generating an output of a distance between the photographic object and the image plane (of the image pickup means) (which will be referred to as R), in which the correction drive control portion controls the drive of correction drive portion in accordance with the output of the angle change detecting means, outputs of the first and second factor generating means and an output of the photographic distance output generating means.

In another embodiment, image-shake correcting photographic apparatus further comprises rotation center detecting means for detecting the rotation center in angle change of optical axis of the photographic apparatus, in which the correction drive control portion controls the drive of correction drive portion in accordance with the output of the angle change detecting means, the output of the condition detecting means, and an output of the rotation center detecting means.

Further, in a combination of the above two embodiments, the correction drive control portion controls the drive of correction drive portion in accordance with the output of the angle change detecting means, the outputs of the first and second factor generating means, the output of the photographic distance output generating means, and the output of the rotation center detecting means.

In another embodiment, the image-shake correcting photographic apparatus further comprises abnormality detecting means for detecting abnormality of either the output of the condition detecting means or the output of the rotation center detecting means, and constant output generating means for generating a constant output independent of the output of the condition detecting means, in which when the abnormality detecting means detects abnormality the drive of correction drive portion is controlled in accordance with the output of the angle change detecting means and the output of the constant output generating means.

Since an image-shake amount is calculated using accurate values of characteristic values of photographic optical system in the apparatus (for example, the focal length: f (=f'), the optical lens thickness: T, the distance between the rear principal plane H' and the image plane: b, etc.), which could vary depending upon photographic conditions, an accurate image-shake amount may be obtained in current photographic condition.

Further, a more accurate image-shake amount may be calculated by determining the rotation center position on optical axis of the apparatus while removing image shakes caused by rotation of the apparatus and eliminating the influence caused by movement of the rotation center position and the incidence portion of photographic lens.

An image-shake correcting photographic apparatus according to the present invention comprises an image pickup means, a photographic optical system held in a lens barrel, an image-shake correction drive portion for shifting an image-shake correction optical system, which is a partial element of the photographic optical system, relative to a screen to effect image-shake correction, angle change detecting means for detecting an angle change of optical axis of the photographic apparatus, condition detecting means for detecting a condition of the photographic optical system, and an image-shake correction drive control portion for controlling a drive of the image-shake correction drive portion in accordance with an output of the angle change detecting means and an output of the condition detecting means, in which a center of gravity and a weight of each of a camera body and an interchangeable lens barrel constituting the photographic apparatus are stored, a position of rotation center is determined by obtaining a total center of gravity of a combination of a camera body with a lens barrel based on the stored information, and the image-shake correction drive control portion controls the drive of image-shake correction drive portion based on the determination of rotation center position.

An image-shake correcting photographic apparatus according to the present invention may comprise calculation means for calculating a total weight for the combination of camera body with lens barrel, and determination means for determining the rotation center of image shakes with an output of the calculation means.

According to the present invention, an image-shake amount may be calculated using accurate values of characteristic values of the photographic optical system in the photographic apparatus (for example, the focal length: f (=f'), the optical lens thickness: T, the distance between the rear principal plane H' and the image plane: b, etc.), which could change depending upon photographic conditions, and the rotation center position is determined based on the gravity center position and the weight specific for the camera body and the lens barrel, so that an accurate rotation center position may be also calculated for any combination of lens barrel with camera body, whereby an accurate image-shake amount may be calculated to effect the image-shake correction by drive-controlling the image-shake correction optical system in necessary condition by the control portion and the drive portion.

Also, according to the present invention, the total weight is calculated for a combination of camera body with interchangeable lens barrel and the rotation center of image shakes is determined in accordance with the total weight, so that an accurate rotation center position may be always calculated and determined for any combination of camera body with lens barrel, whereby an accurate image-shake amount may be calculated to effect the image-shake correction by drive-controlling the image-shake correction optical system in necessary condition by the control portion and the drive portion.

DESCRIPTION OF THE PREFERRED EMBODIMENTS

Figure 1:
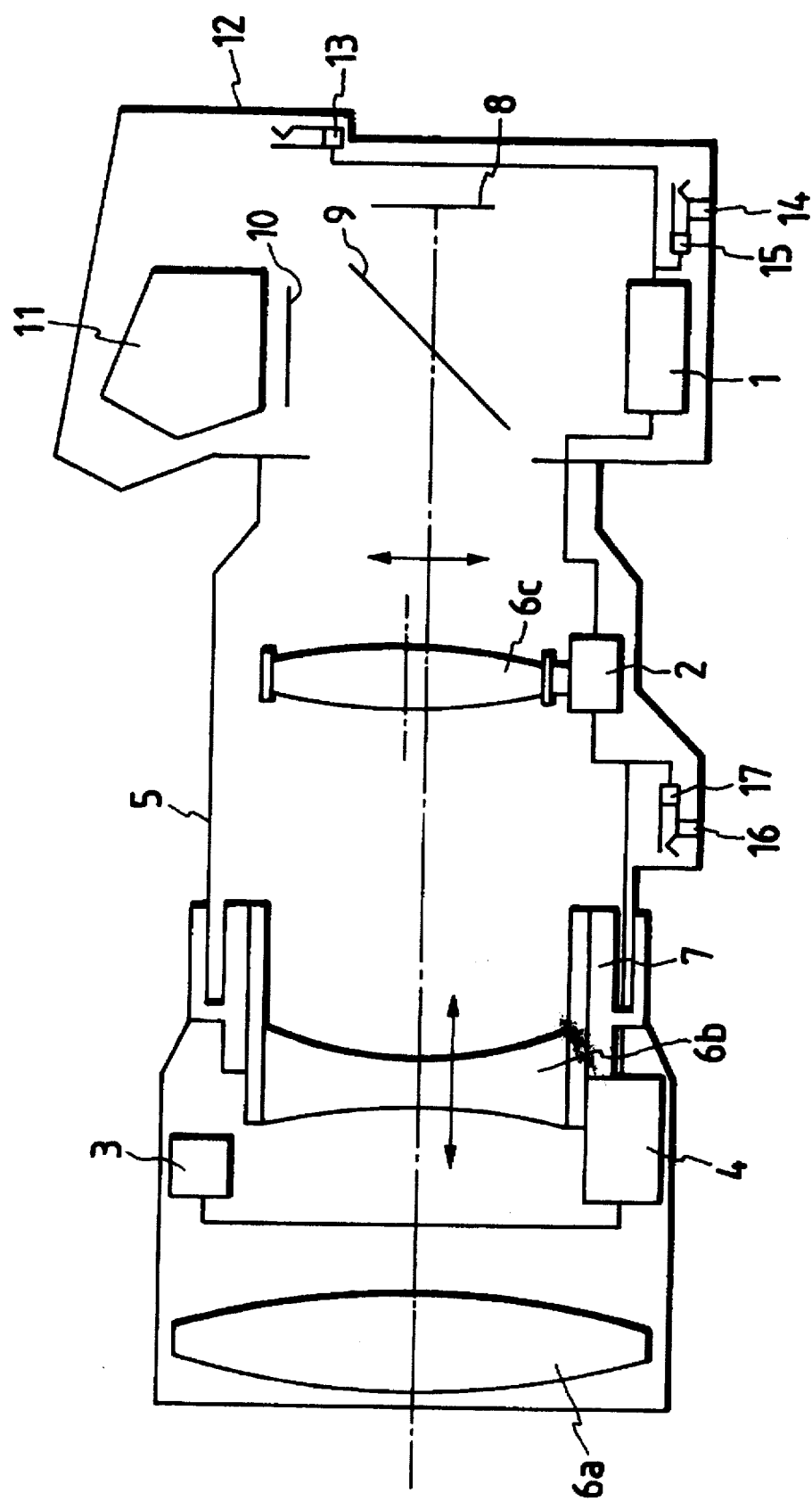
FIG. 1 is a drawing to show a preferred embodiment of the camera according to the present invention.

FIG. 1 shows a preferred embodiment of the camera according to the present invention.

Reference numeral 1 designates a camera CPU unit, which performs a correction drive control of an image-shake correction optical system, using outputs from various detection portions. The CPU unit has a ROM portion or RAM portion for storing numerical values necessary for calculation.

Numeral 2 denotes a correction drive portion for shift-driving the image-shake correction optical system under control of the camera CPU unit 1. The control drive portion 2 has a monitor portion for detecting an amount of shift of the correction system to send a monitor signal to the camera CPU unit 1.

Numeral 3 represents an angular velocity detection portion fixed in a casing 5 of camera apparatus to detect an angular velocity of rotational shakes of the camera apparatus. A known vibration gyro angular velocity meter is used herein. Of course, the invention is not limited to it.

Numeral 4 designates a focus position detecting portion for detecting a position of a focus adjustment optical system. The focus position detecting portion 4 is formed as an encoder for reading a position of rotation of a focus cam ring 7, as will be detailed later, which can detect a condition of a photographic optical system 6 (as described below).

Numeral 5 denotes a casing for camera body and lens barrel, which is a component of the camera apparatus.

Numeral 6 is a photographic optical system. The details of lens construction are omitted herein but the photographic optical system 6 employs the lens of the type as described in Japanese Laid-open Patent Application No. 2-234115 filed by Applicant.

Numeral 6a is a first lens group (convex lens group), which is stationary with respect to the casing 5.

Numeral 6b is a second lens group (concave lens group), which is movable back and forth along the optical axis with respect to the casing 5 to effect focus adjustment. The focus adjustment is carried out by rotation of a focus cam ring 7 as described below.

Numeral 6c is a third lens group (convex lens group), movable (capable of shifting) in the direction normal to the optical axis to effect the image-shake correction. The third lens group 6c does not change its relation with the casing 5 along the optical axis upon shifting.

It is assumed herein that a ratio of a shift amount (ds) of the third lens group 6c to an image correction amount (di which is an amount of image movement by the shift of the third lens group 6c) is set as ds:di=1:1 (i.e., ds=di).

Generally, the relation should be considered in reality as ds=di×C (where C is a constant).

Numeral 7 denotes a focus cam ring, in which a cam groove is formed. Rotation of the focus cam ring 7 moves the second lens group of photographic optical system along the optical axis to effect the focus adjustment.

Numeral 8 is a photographic film.

Numeral 9 is a quick return mirror.

Numeral 10 is a finder screen.

Numeral 11 is a pentaprism.

Numeral 12 is a viewing window portion.

Numeral 13 is a viewing window or finder switch, which is closed when a face of photographer is in contact with the viewing window portion 12.

Numeral 14 is a tripod base L provided immediately below the photographic film 8.

Numeral 15 is a tripod base L switch, which is closed when a tripod is set at the tripod base L 14.

Numeral 16 is a tripod base M provided in the middle of the lens barrel.

Numeral 17 is a tripod base M switch, which is closed when a tripod is set at the tripod base M 16.

Figure 2:
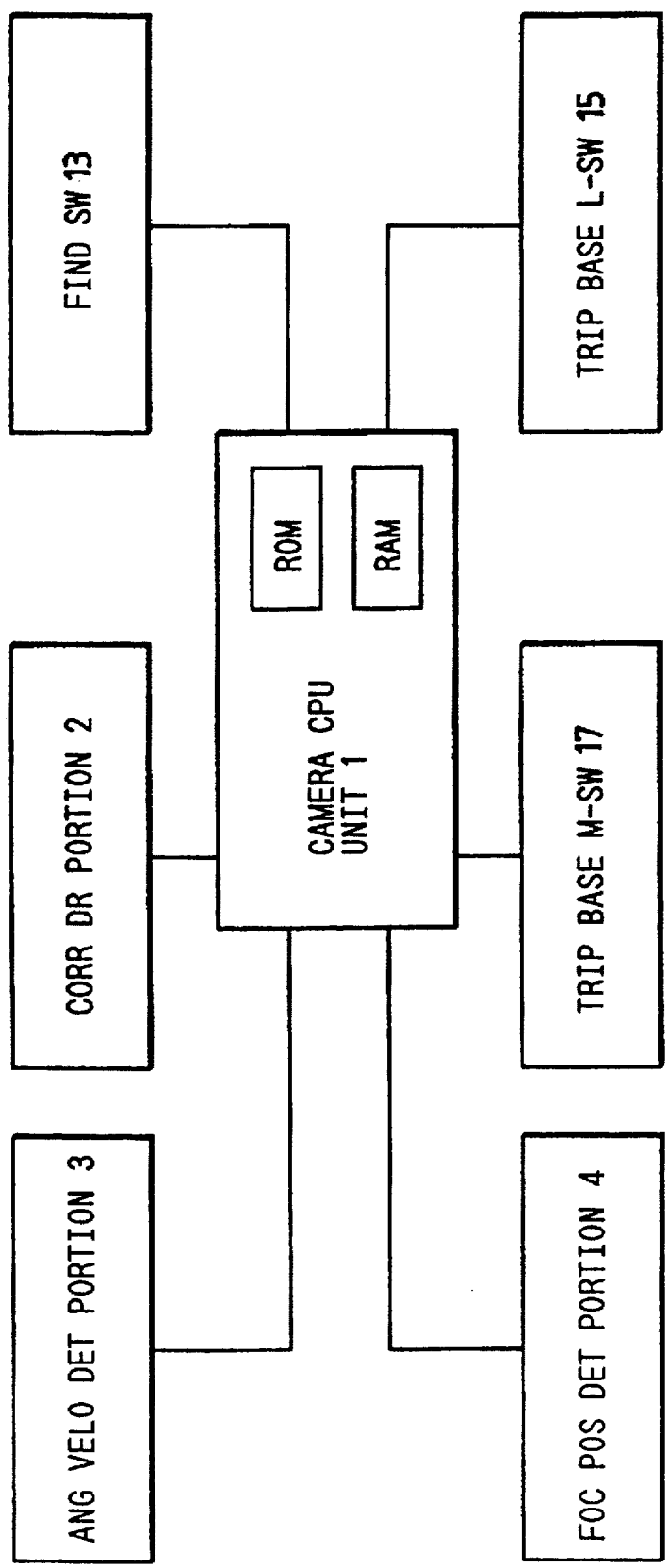
FIG. 2 is a block diagram of the embodiment as shown in FIG. 1.

FIG. 2 is a block diagram of the embodiment as shown in FIG. 1.

Connected for signal communications to the camera CPU unit 1 are the correction drive portion 2, the angular velocity detecting portion 3, the focus position detecting portion 4, the viewing window switch 13, the tripod base L switch 15, and the tripod base M switch 17.

The camera CPU unit 1 is so arranged as to detect closure of each switch.

There is a distance "m" between the photographic film 8 and the tripod base M 16, which is stored in the ROM portion in the camera CPU unit 1.

Figure 3:
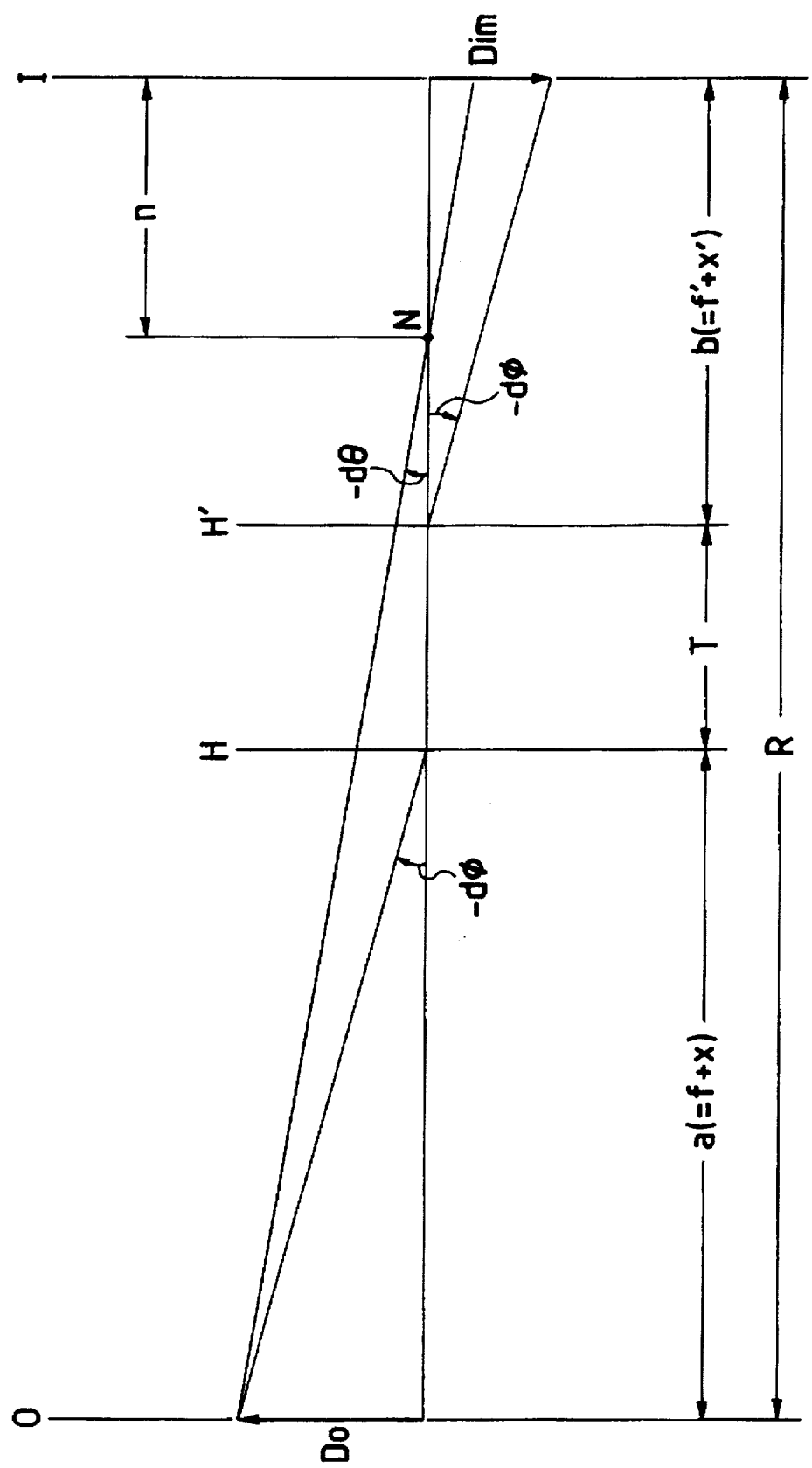
FIG. 3 is a drawing to illustrate a relationship between a shake of camera (change in angle of optical axis) and an image shake of subject image.

Now described with FIG. 3 is a relationship between a shake of the camera apparatus according to the present invention (a change in angle of optical axis) and an image shake of subject image.

A distance between a photographic subject and a front principal plane (H) of the photographic optical system is represented by a.

A distance between a rear principal plane (H') of the photographic optical system and an image plane is represented by b.

The image plane is specifically a position always constant to the casing 5 on a surface of the photographic film 8. Further, a distance between the front principal plane (H) and the rear principal plane (H') of the photographic optical system is represented by T, (which is the optical lens thickness as described hereinbefore).

Also, a distance between the photographic subject and the image plane is represented by R, which may be expressed by the following equation.

$$R = a + T + b \qquad \text{(Equation 1)}$$

A change in angle of optical axis means that the camera apparatus is moved to rotate its optical axis about a point on the optical axis. Letting this center of rotation be at point N, a distance between the point N and the image plane is represented by n.

Suppose that the optical axis of the camera apparatus is rotated by $d\theta$ about the point N within a fine unit time (dt) with respect to a stationary subject, as shown in FIG. 3.

Expressing it in other words with the reference of the optical axis of the apparatus, the direction of subject is rotated by $(-d\theta)$ about the point N with respect to the apparatus. In FIG. 3 Do represents an amount corresponding to the movement of subject upon this rotation.

If a change amount of incident angle of subject light into the photographic optical system is $(-d\Phi)$, it is expressed by the following relation.

$$-d\Phi = (a + T + b - n) \times (-d\theta)/a \qquad \text{(Equation 2)}$$
$$= -d\theta \times (R - n)/a$$

Accordingly, an image-shake amount (which is represented by Dim in FIG. 3) is obtained as follows from the image formation relation.

$$Dim = b \times (-d\Phi) \qquad \text{(Equation 3)}$$
$$= -b \times d\theta \times (R - n)/a$$

Since the relation between the shift amount of correction system and the image movement is set as ds=di in the present embodiment, as described with FIG. 1, the above image-shake amount Dim may be corrected by shifting the correction optical system by the same amount in the reverse direction. If a shift drive amount of the correction optical system with the optical axis change amount $d\theta$ is $ds$ $(d\theta)$, it is obtained as follows.

$$ds(d\theta) = -Dim \qquad \text{(Equation 4)}$$
$$= b \times d\theta \times (R - n)/a$$

Since ds=d×C generally, the following equation is obtained.

$$ds(d\theta) = C \times b \times d\theta \times (R - n)/a \qquad \text{(Equation 5)}$$

(where C is a constant.)

Even if the position of the correction optical system is already apart from the center position (while the image-shake correction drive is continued), the same correction drive as described with FIG. 3 and with (Equation 1) to (Equation 5) may be employed.

If a shift position of the correction optical system is S (t1) at start (t1) of image-shake correction drive as described above, the following relation stands with a shift position of the correction optical system at time dt thereafter, S(t1+dt).

$$S(t1 + dt) = S(t1) + ds(d\theta)$$
$$= S(t1) + \{C \times b \times d\theta \times (R - n)/a\}$$ (Equation 6)

In above (Equation 4) and (Equation 5), the focal length (which is f=f') and the lens thickness "T" changes depending upon the photographic distance "R" in case of the internal focusing lens as in the present embodiment. In case of a normal lens of all elements feed-out type, the values "f (=f')" and "T" do not vary. Therefore, by preliminarily storing only the numerical information on them in the camera apparatus, the values "a" and "b" may be obtained by a simple calculation (by the Newton's imaging equation) if only the photographic distance "R" can be detected (for example by detecting a rotational position of the lens distance ring).

However, since the internal focusing lens changes the values of "f (=f')" and "T" depending upon the photographic distance "R", an accurate image-shake amount cannot be calculated only by simply storing the values of "f (=f')" and "T".

In contrast, an internal focus lens (which is of single focus type) can have fixed values of "f (=f')", or "T" and "f (=f')" for "R" in a certain photographic condition, whereby the value "b" may be also uniquely determined.

Accordingly, if a rotational position of the lens distance ring is detected to obtain accurate values of "T" and "b" based on the detection result and if the thus obtained accurate values can be used for sequential calculation, the variables "b", "R" and "a" used in "Equation 4" can be determined every time to enable calculation of accurate image-shake amount.

The focus position detecting portion 4 described in FIG. 1 is provided for this purpose, which outputs information on rotational position of focus cam ring to the camera CPU unit 1. The camera CPU unit 1 preliminarily stores a correspondence table between the focus position and the above values "b", "R" and "a" in its ROM portion for use in calculating the image-shake amount.

The following describes how to determine another variable "n" in (Equation 4).

The shakes of the camera apparatus are frequently seen in hand-carrying photography as hand shakes or in photography with the camera being mounted on a tripod as wind shakes.

In case of the hand-carrying photography, the rear end of camera could not be displaced too much because the face of photographer is in contact with the camera at the viewing window. Therefore, the rotational shakes of the camera apparatus are likely to be rotational shakes about a rotation center near the viewing window (i.e., the rear end portion of camera).

In case of the photography with tripod, the tripod mounting portion will not be greatly displaced normally, but rotational shakes of the camera apparatus may be mostly caused by slight backlash at a screw portion or a tripod head. The rotational shakes of the camera apparatus are mostly those about a rotation center near the tripod mounting portion in this case.

Thus, the position of rotation center of optical axis of camera apparatus may be specifically determined with determination of support condition of camera.

The viewing window switch 13, the tripod base L switch 15 and the tripod base M switch 17 described with FIG. 1 are provided for this purpose. The camera CPU unit 1 detects closure of each switch. The camera CPU unit 1 preliminarily stores a correspondence table of above values of "n" to be employed for closure of respective switches, in its ROM portion for use in calculating the image-shake amount.

In this example, a stored value "n" employed upon detection of closure of either the viewing window switch 13 or the tripod base L switch 15 is "0", and that upon detection of closure of the tripod base M switch 17 is "m". As will be described hereinafter, a substitute value "N1" is also prepared as a stored value of "n" for a case that the position of rotation center cannot be specifically determined.

Finally, the following concerns how to determine the variable "dθ" in (Equation 4).

The camera CPU unit 1 first detects an angular velocity signal output from the angular velocity detecting portion 3, and calculates an angular velocity of rotation shakes "ω", using a conversion factor between strength of angular velocity signal and value of angular velocity preliminarily stored in the ROM portion.

The camera CPU unit 1 executes this detection operation of angular velocity signal every constant unit time (every dt).

Then, "dθ" is calculated from the following equation.

$$d\theta = \omega \times dt$$ (Equation 7)

By the above operation, all variables used in (Equation 4) are determined, so that a shift drive amount of correction optical system ds (dθ) may be calculated with the optical axis change amount dθ.

Although the shift drive amount of correction optical system ds (dθ) was calculated with dθ of optical axis change amount of camera apparatus in the above description, the following equation similar to (Equation 4) may be used also in determining a shift drive speed of correction optical system (as will be referred to as ds' (ω)) with a velocity of optical axis inclination of camera apparatus, that is, with an angular velocity "ω" of rotation shakes.

$$ds'(\omega) = b \times \omega \times (R-n)/a$$ (Equation 8)

The following equation should be employed for a general case similarly as (Equation 5).

$$ds'(\omega) = C \times b \times \omega \times (R-n)/a$$ (Equation 9)

(C: Constant)

Figure 4:
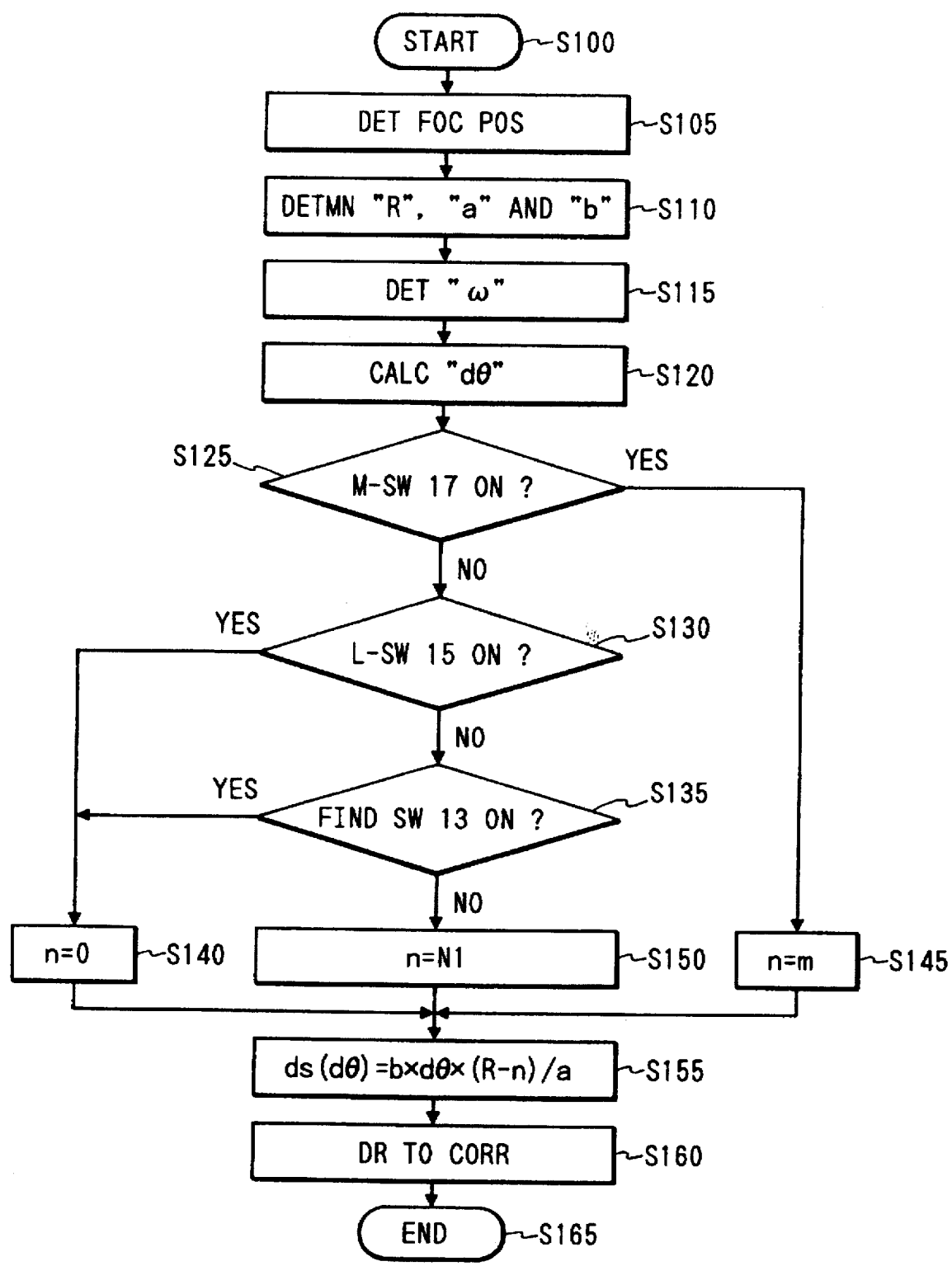
FIG. 4 is a drawing to illustrate the operational sequence for image-shake correction in the embodiment according to the present invention.

FIG. 4 is a drawing to illustrate the operational sequence concerning the image-shake correction in the present embodiment as shown in FIG. 1. The calculation of image-shake correction amount is based on the equations described with FIG. 3. Unless otherwise stated, steps are carried out by the camera CPU unit 1.

The flow starts from Step (as will be abbreviated as S) 100 and goes to S105, where the CPU receives a position detection signal of the focusing optical system (the second lens group 6b in photographic optical system) from the focus position detecting portion 4 to detect a current condition of lens.

At S110, the CPU selects in correspondence with the input signal at S105 numerical values of photographic distance "R", distance "a" between photographic object and front principal plane (H) of photographic optical system, and distance "b" between rear principal plane (H') of photographic optical system and imaging point from numerical values preliminarily stored in the ROM portion in the camera CPU unit 1, which are used for the following calculation.

At S115, an angular velocity signal output from the angular velocity detecting portion 3 is detected and an angular velocity "ω" of rotation shakes is calculated using the conversion factor between angular velocity signal strength and angular velocity value preliminarily stored in ROM portion in camera CPU unit 1.

At S120, an optical axis change amount "dθ" caused by rotation shakes of the camera apparatus in a predetermined time is calculated. The camera CPU unit 1 executes the angular velocity signal calculation operation at S115 every predetermined unit time (every dt). "dθ" is calculated as described in (Equation 7), i.e., dθ=ω×dt. The predetermined time dt used herein is a time necessary for a serial operation (routine) of S100 to S165, that is, a time between execution of S115 in previous routine and execution of S115 in current routine.

Next steps from S125 are for detecting a rotation center of rotation shakes of camera apparatus.

First at S125, it is detected whether the tripod base M switch 17 is in on (closed) state. If it is in on state, the flow goes to S145. Unless in on state then the flow goes to next S130. At S130, it is detected whether the tripod base L switch 15 is in on (closed) state. If it is in on state then the flow goes to S140. Unless in on state then the flow goes to next S135. At S135, it is detected whether the viewing window or finder switch 13 is in on (closed) state. If it is in on state then the flow goes to S140 similarly. Unless in on state then the low goes to S150.

Steps of S140, S145 and S150 are for setting a value of variable "n" used in subsequent calculation of image-shake correction drive amount (at S155).

First at S140 n=0 is set. Reaching S140 means that the camera is in contact with face of photographer at the viewing window 12 or that a tripod is fixed at the tripod base L 14 immediately below the photographic film 8. Then, the position of rotation center of optical axis of camera apparatus is at the proximity of photographic film 8 or viewing window 12, and therefore n=0 is set as described with above (Equation 4).

Next at S145 n=m is set. Reaching S145 means that a tripod is set at the tripod base M 16 at distance m apart from the photographic film 8, as described before. Reaching S150 means that neither the tripod base M switch 17, the tripod base L switch 15 nor the viewing window switch 13 is in on (closed) state. In this case, the support condition of camera cannot be judged from states of the switches, so that the rotation center on optical axis cannot be determined. In this example n=N1. N1 is a numerical value conceivable most appropriate for circumstances reaching S150 and preliminarily stored in ROM portion in camera CPU unit 1. A choice of the most appropriate numerical value is a distance between the center of gravity of the camera apparatus and the photographic film 8. However, the invention is not limited to that numerical value. Another choice may be a numerical value obtained by experiments in production of camera apparatus as statistically most excellent. There is no inconvenience even if the numerical value is coincident by chance with "0" or "m".

After the value of variable "n" is set at S140 to S150, the flow goes to S155. At S155, an image-shake correction drive amount is calculated using (Equation 4) as described with FIG. 3 (or using (Equation 5) for a general solution).

The flow then goes to S160 to control the correction drive portion 2 to shift-drive the image-shake correction optical system. A shift amount of correction system is sent as a monitor signal from the correction drive portion 2 to the camera CPU unit 1, enabling easy and high-precision drive control of the correction drive portion 2 by the camera CPU unit 1.

After completing the above steps, the flow goes to S165 to conclude a cycle of routine. The routine of S110 to S165 is constantly repeated during the image-shake correction drive. As described above, the time dt is a time necessary for execution of serial operation (routine) of S100 to S165.

As described, the apparatus according to the present invention can calculate an accurate image-shake amount from the rotation shake angle "dθ" of apparatus detected after determining from the lens condition the values of photographic distance "R", distance "a" between photographic object and front principal plane (H) of photographic optical system, and distance "b" between rear principal plane (H') of photographic optical system and imaging point, and further after determining the distance "n" between the rotation center point N and imaging point for each situation, enabling the image-shake correction drive to accurately correct the image shakes using the accurate image-shake amount.

It should be understood that the arrangement and operational sequence of apparatus is not limited to those described in FIG. 1 or FIG. 4.

Although FIG. 1 shows only the angular velocity detecting portion and the correction drive portion for vertical shakes, it is clear that the present invention can be applied to correction of horizontal shakes (in the direction normal to the sheet plane of FIG. 1). The present invention may also be applied to correction of a combination of horizontal and vertical shakes.

Although the above example includes two tripod bases, a single tripod base or tripod bases of more than two may be employed by properly determining a position or positions of support (specifically by arranging the steps of S125 to S150), in the same manner as in the above example.

Also, although the set values for "n" at S140 and S145 and the set value for "n" at S150 as described in FIG. 4 were numerical values preliminarily stored in ROM portion in camera CPU unit 1, they may be made freely adjustable for example by adding an input dial (not shown) connected with the camera CPU unit 1 to the example of FIG. 1 so that they may be set through dial operation during observation trough the finder so as to effect best correction.

Figure 5:
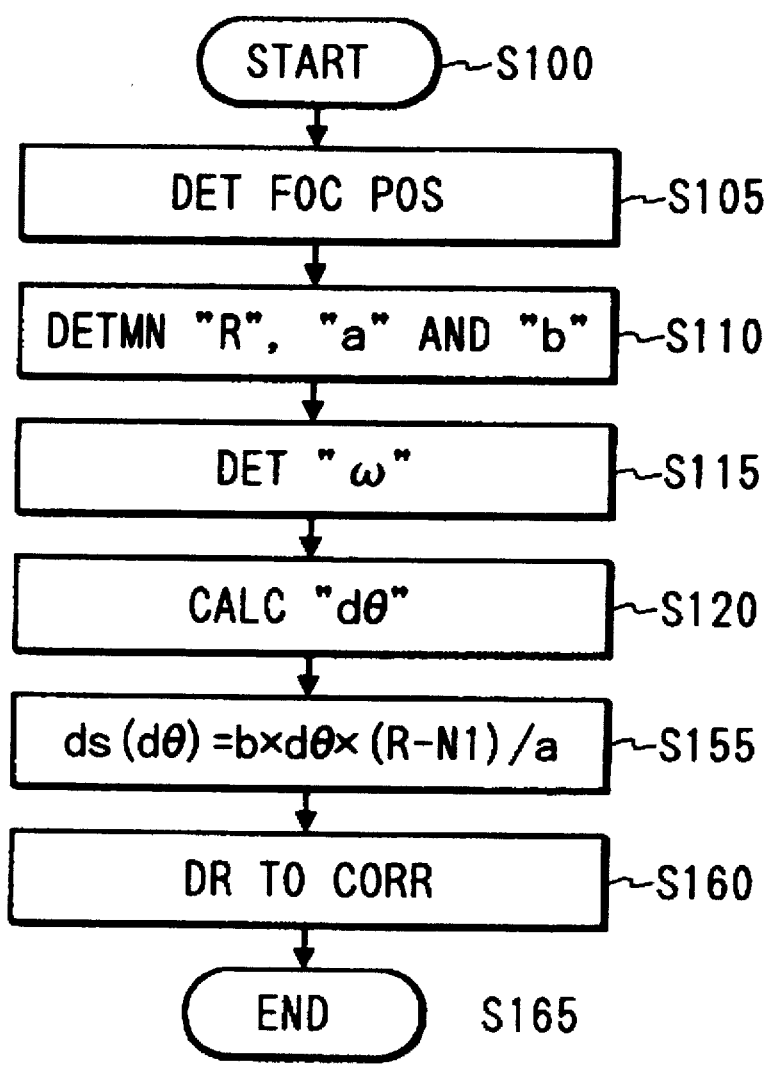
FIG. 5 is a drawing to illustrate the operational sequence in a modification of the embodiment as described with FIG. 4.

FIG. 5 shows a simplified modification of the example as described with FIG. 4, which is an example in which the switches for determining the rotation center as described in FIG. 1 are omitted. Illustration of this example is omitted.

The total weight of camera will be so heavy for example in combination of a telephotographic lens of large aperture with a relatively heavy body including motor drive.

If the camera is used for photography while hand-carried, rotational shakes of camera are likely to be rotation about the position of gravity center of the entire camera because of heavy weight thereof even in case of photographer's face contacting with the camera viewing window.

Then, the switches as described before are omitted, achieving a reduction in production cost, and only the routine of from S135 to S150 is used from the flow described in FIG. 4.

FIG. 5 is a drawing to illustrate the operational sequence in this example. The contents of respective steps are equivalent to those in FIG. 4, and therefore omitted to explain herein.

In this example, the factor "N1" at S155 is a stored value corresponding to a distance between the gravity center of the camera apparatus and the photographic film 8, as described before.

Also in this example, the factor "N1" may be made adjustable for example by adding an input dial (not shown)

connected to the camera CPU unit 1, as described above, to determine an optimum value thereby to effect best correction. Alternatively, the camera may of course have a selection switch to permit selection from stepwise values so as to determine the optimum value.

Figure 6:
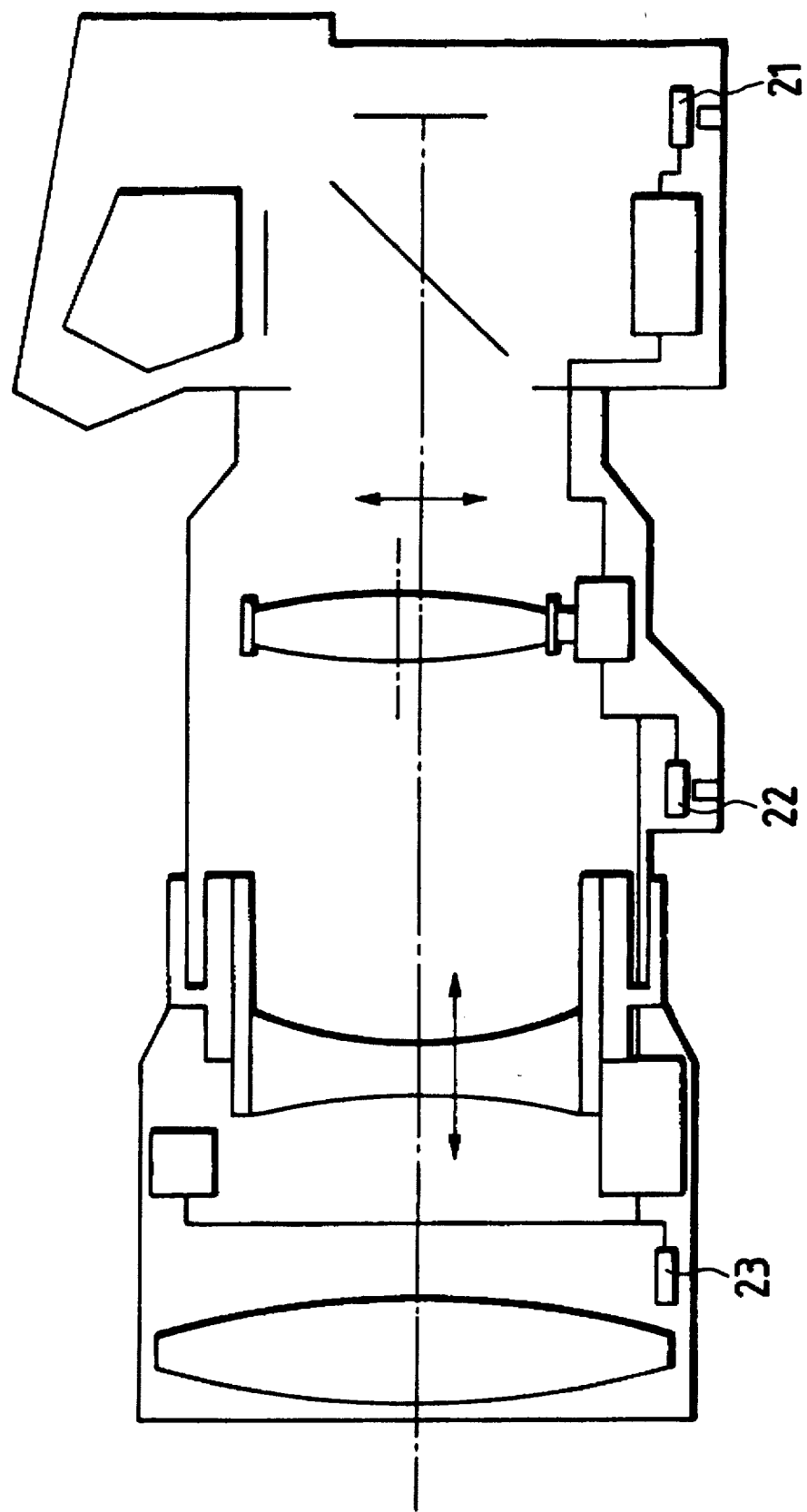
FIG. 6 is a drawing to show an example using an accelerometer for detection of rotation center.
Figure 7:
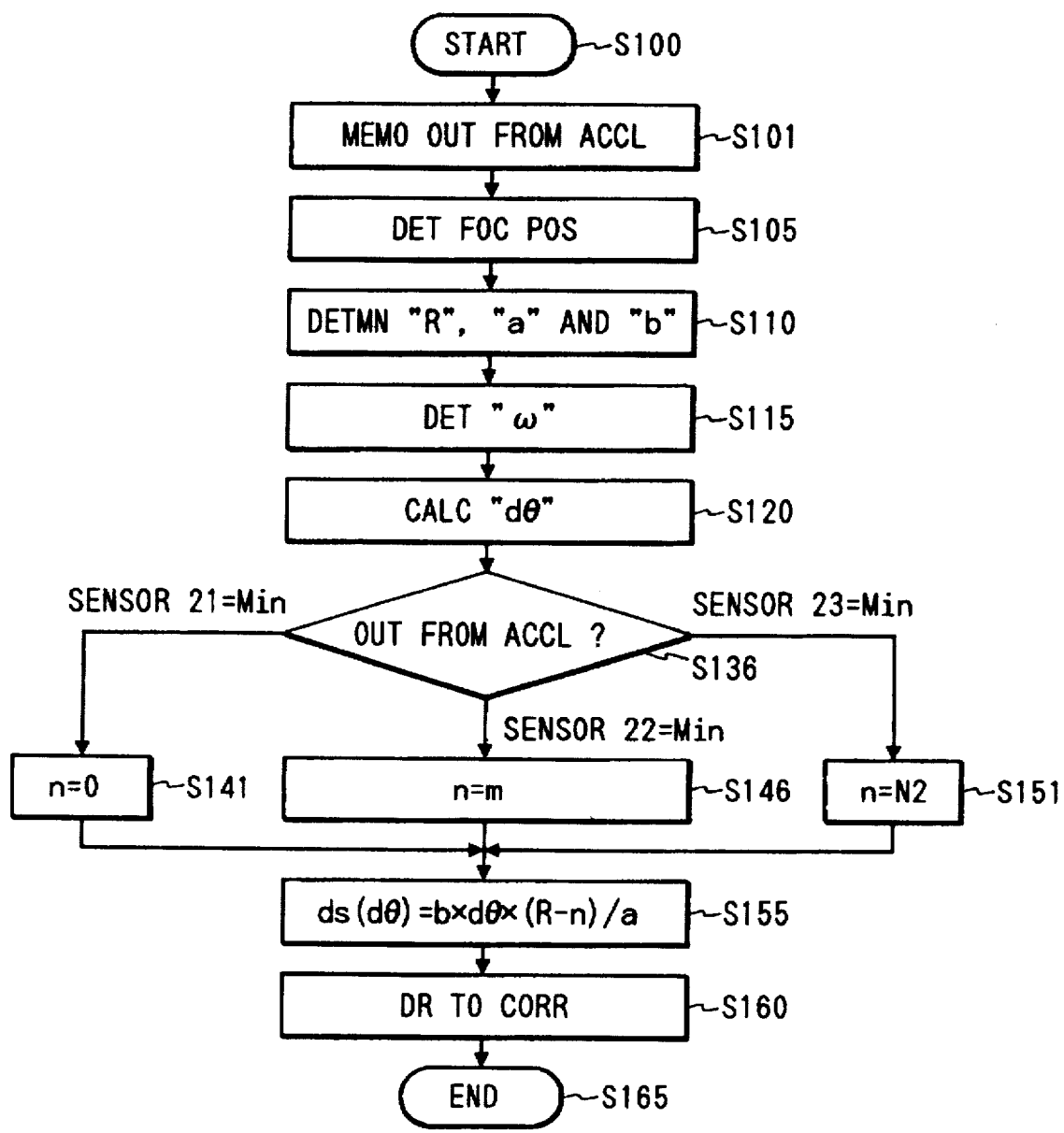
FIG. 7 is a drawing to illustrate the operational sequence for image-shake correction in the example as shown in FIG. 6.
Figure 8:
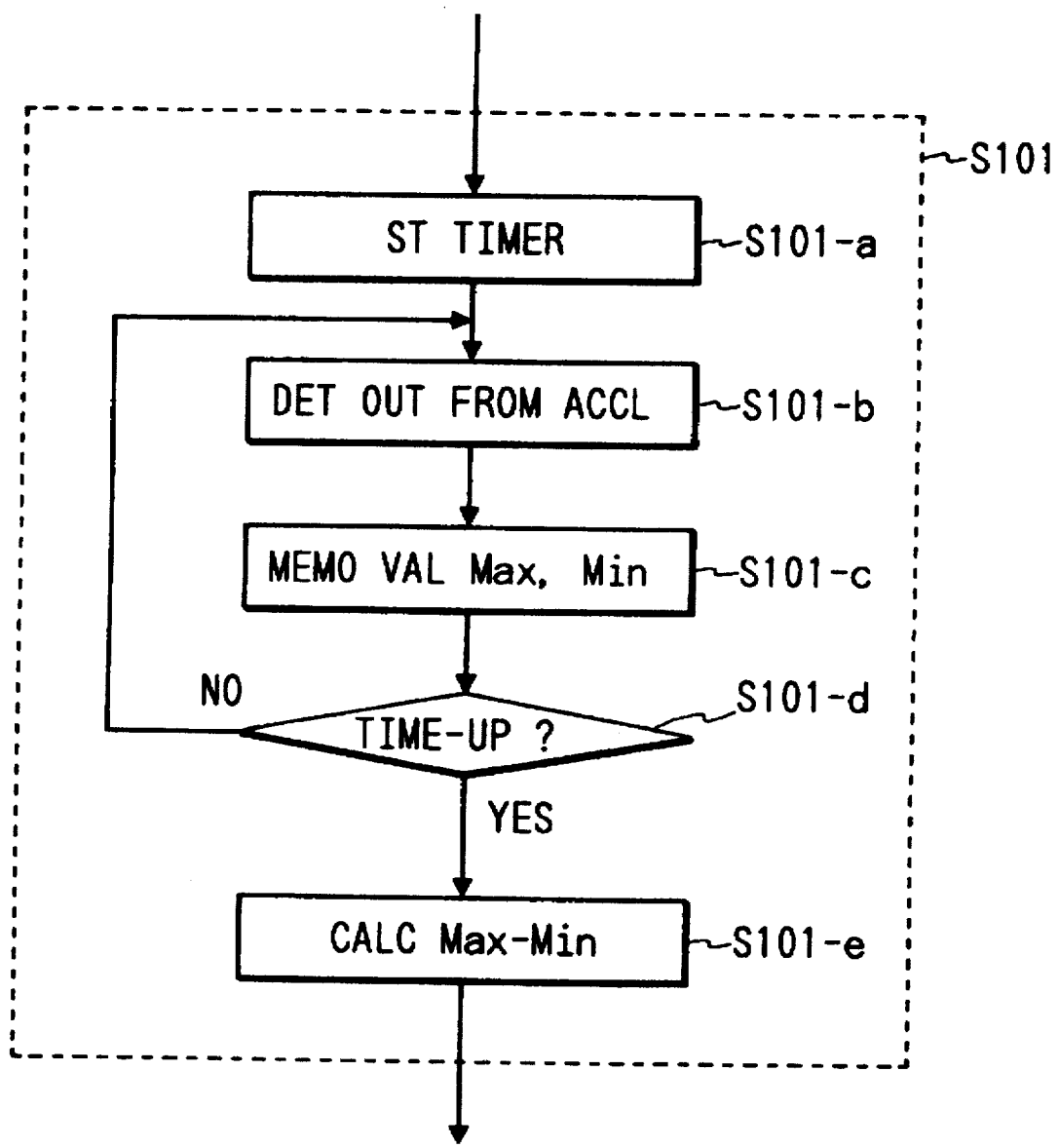
FIG. 8 is a drawing to illustrate the details of steps in FIG. 7.

FIG. 6, FIG. 7 and FIG. 8 show another embodiment of a different type from the embodiment as described with FIG. 1 and FIG. 4.

The embodiment of FIG. 6 is different from that of FIG. 1 in that shake sensors are used for determining the rotation center in place of the switches. The shake sensors herein may be among conventional accelerometers, specifically relatively cheap and compact piezo resistance type accelerometers formed by IC process, or still cheaper piezo-electric device type accelerometers. These shake sensors are disposed such that the sensitive axis thereof is oriented in the direction normal to the optical axis, that is, in the same direction as the shift drive direction of the image-shake correction optical system.

The embodiment of FIG. 6 is now described in more detail. Accelerometers 21–23 are mounted at respective positions in the camera apparatus to output an acceleration signal to the camera CPU unit 1. The camera CPU unit 1 compares changes of the outputs in unit time with each other for example, and judges that the center of rotational shakes of camera apparatus is in the proximity of an accelerometer having a smallest change. The reason is as follows. Camera shakes in hand-carry condition are continuous vibration vibrating near a certain neutral position so that a change in circumferential acceleration in rotation is small near the rotation center position but becomes larger as leaving the center. It can be thus supposed that the center of rotational shakes of camera apparatus is near the accelerometer having the smallest change. As described, the rotational center position of shakes of camera apparatus can also be determined with the shake sensors.

FIG. 7 is a drawing to illustrate the operational sequence concerning the image-shake correction in the example shown in FIG. 6.

Duplicating steps have the same contents as those in FIG. 4, and therefore omitted to explain here.

The flow starts from step (as abbreviated S) 100 and then goes to S101. At S101 a change amount of each accelerometer in unit time is detected and stored.

The details of S101 are shown in FIG. 8.

First at S101-a, the camera CPU unit 1 starts a timer for counting the unit time, and at S101-b outputs of accelerometers 21–23 are detected.

Then at S101-c, a maximum (Max) and a minimum (Min) of the output of each accelerometer in unit time are updated while stored in RAM in camera CPU unit 1.

Then at S101-d it is judged whether the unit time has elapsed. Unless elapsed then the flow returns to S101-b; if elapsed then the flow goes to next S101-e.

At S101-e, a change amount of each accelerometer in unit time is calculated by subtracting the minimum from the maximum of output from each accelerometer, and the calculation result is stored in RAM portion in camera CPU unit 1. The stored values are used at S136.

After completion of S101, S105 to S120 are the same as in FIG. 4.

Next at S136, the change amounts of outputs from the accelerometers in unit time calculated above are compared with each other to determine an accelerometer having a smallest change amount, and the flow is split depending upon the determined accelerometer to set a value of factor "n" equivalent to a distance between the photographic film 8 and the position where the accelerometer having the smallest change amount is positioned.

At S136, if it is judged that the output change amount of accelerometer 21 is minimum, it is assumed that the rotation center of shakes of camera apparatus is near the rear end portion of camera, that is, near the photographic film 8, and the flow goes to S141 to set n=0.

Further, if it is judged at S136 that the output change amount of accelerometer 22 is minimum, it is assumed that the rotation center of shakes of camera apparatus is near the central portion of lens, that is, at distance m from the photographic film 8, and the flow goes to S146 to set n=m.

Finally at S136, if it is judged that the output change amount of accelerometer 23 is minimum, it is assumed that the rotation center of shakes of camera apparatus is near the fore end portion of lens, that is, at distance N2 from the photographic film 8, and the flow goes to S151 to set n=N2.

After completion of these steps, the flow then goes to steps from S160. The subsequent steps are the same as those in FIG. 4, and therefore omitted to explain here.

The method to determine the rotation shake center of camera apparatus using the shake sensors such as the accelerometers is not limited to the above method.

For example, an output of each accelerometer 21–23 is made to pass through a high-pass filter (to remove a DC acceleration component rising from gravity), each filtered output is integrated twice over each unit time to convert it into a positional change amount, and the center of rotational shakes is then determined based on comparison between positional change amounts. The rotation center position is determined by a smallest position change amount.

Another arrangement is as follows. A threshold value is set in determining the rotation center from the change amount of acceleration or from the position change amount by double integral as described above. If either change amount becomes below a certain value of threshold, the position of a shake sensor with the value may be determined as the rotation center. If there is no change amount below the threshold, an image-shake correction drive amount may be calculated using the preliminarily set factor in the same manner as described in FIG. 5, or a rotation center position determined in previous routine may be employed as it is.

Although the embodiments described with FIG. 1 and FIG. 4 showed camera apparatus provided with internal focusing telephotographic lens, the present invention is not limited to such lens type.

Figure 9:
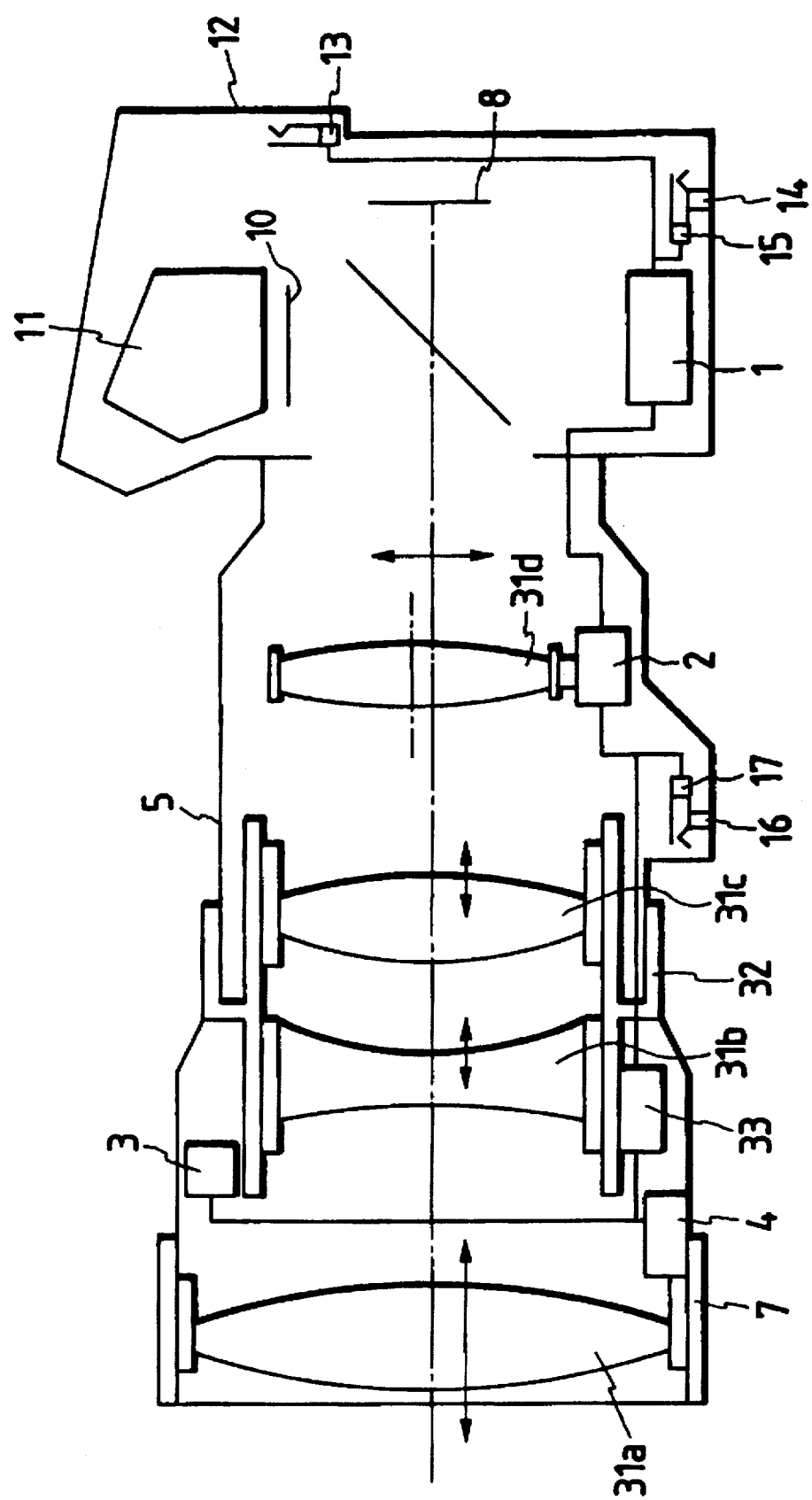
FIG. 9 is a drawing to show an example of a camera apparatus provided with a zoom lens in photographic optical system.

FIG. 9 shows an example of camera apparatus provided with zoom lens. Elements different from those in FIG. 1 are mainly described in the following while common elements are omitted to explain.

Numeral 4 denotes a focus position detecting portion. It has the same function as that in FIG. 1, but is located at different relative position to the casing 5 or to a zoom photographic optical system 31 as detailed later.

Numeral 7 designates a focus cam ring. It also has the same function but is located at different position as compared with FIG. 1, similarly as the focus position detecting portion 4.

Numeral 31 represents a zoom photographic optical system. Although the details of lens construction are omitted in this figure, it may be for example one disclosed in U.S. Pat. No. 4,978,205 owned by Applicant. Of course, the zoom photographic optical system is not limited to that.

Numeral 31a represents a first lens group (convex lens group). It is movable back and forth along the optical axis with respect to the casing 5 to effect focus adjustment. The focus adjustment is carried out by rotation of the focus cam ring 7.

Numeral 31b represents a second lens group (concave lens group). It is movable back and forth along the optical axis with respect to the casing 11 to effect zoom adjustment in combination with movement of a third lens group 32c as described below.

Numeral 31c represents a third lens group (convex lens group). It is movable back and forth along the optical axis with respect to the casing 11 with movement of the second lens group 32b.

Numeral 31d represents a fourth lens group (convex lens group). It is movable (shiftable) in the direction normal to the optical axis to effect image-shake correction. The fourth lens group is fixed relative to the casing 11 in the direction along the optical axis.

It is also assumed in this embodiment that a ratio of a shift amount of the fourth lens group 31d (ds) to image correction amount (di which is an amount of image movement by shift of the fourth lens group 31d) is arranged as ds:di=1:1 (i.e., ds=di).

Generally, the ratio should be determined in practice as ds=di×C (C: constant) similarly as in FIG. 1.

Numeral 32 denotes a zoom cam ring. The zoom cam ring 32 has two cam grooves for moving the second lens group 31b of zoom photographic optical system and the third lens group 31c of zoom photographic optical system along the zoom optical axis. The zoom adjustment is carried out by rotation of this member.

Numeral 33 denotes a zoom position detecting portion for detecting a position of zoom adjustment optical system. It is an encoder to read a rotational position of zoom cam ring 32. This detecting portion is also connected to the camera CPU unit 1 for signal communications.

In the example shown in FIG. 1, the condition of photographic optical system 6 is determined from the position of second lens group 6b of photographic optical system relative to the casing 5 as the photographic distance of subject may also be determined. Therefore, all variables "R", "a" and "b" may be uniquely detected and determined only with the output of focus position detecting portion 4 detecting the rotational position of focus cam ring 7.

In contrast, in the example of zoom lens in FIG. 9, the condition of zoom photographic optical system 31 can be determined with a combination of position of first lens group 31a, which is the focus adjustment optical system, with positions of second lens group 31b and third lens group 31c, which are the zoom adjustment optical system.

As described in description of above-discussed (Equation 4), the factors "R", "a" and "b" cannot be determined for each lens condition unless the optical lens thickness "T" has been determined. Some zoom lenses change lens thickness "T" thereof with a change in relative positional relation between the lens groups, depending upon the structure of zoom lens, as described with the example of internal focusing telephotographic lens.

Therefore, in order to determine the factors "R", "a" and "b", the condition of zoom photographic optical system 31 should be detected using both detection outputs from the focus position detecting portion 4 and the zoom position detecting portion 33 respectively detecting the rotational position of cam ring moving the lens group, and then the above factors may be determined, as in the example of FIG. 9.

A specific method is as follows. The ROM portion in camera CPU unit 1 includes a factor storing portion with values in two-dimensional array composed of rows selected depending upon the output of focus position detecting portion 4 and columns selected depending upon the output of zoom position detecting portion 33. The image-shake correction shift amount may be calculated using factors stored in factor storing portion with the two outputs (which are suitable factors obtained by optical calculation or by experiments and preliminarily stored).

Figure 10:
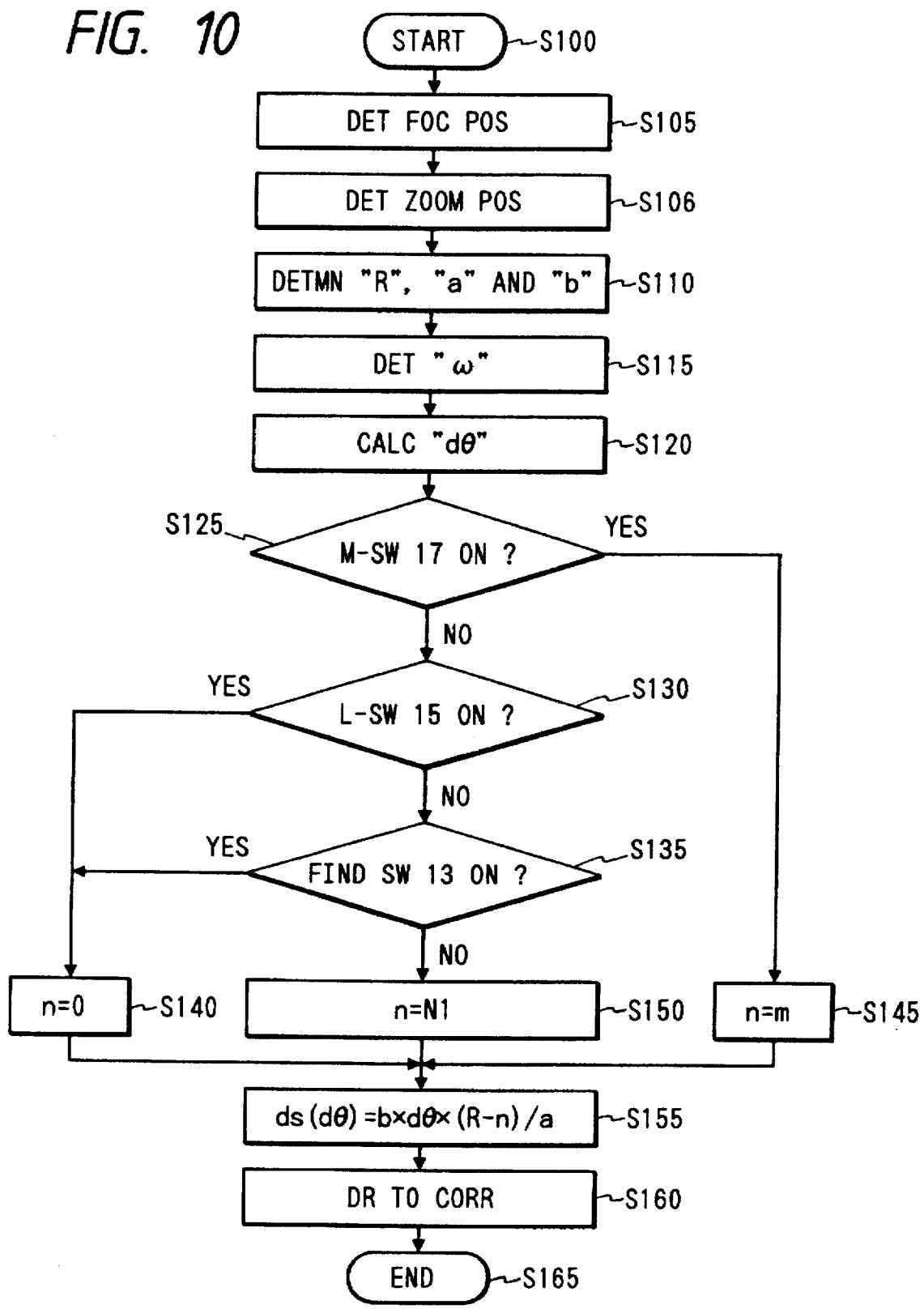
FIG. 10 is a drawing to illustrate the operational sequence for image-shake correction in the example of the present invention as shown in FIG. 9.

FIG. 10 is a drawing to illustrate the operational sequence concerning the image-shake correction in the example of the invention as shown in FIG. 9. Unless otherwise stated, steps are processed in the camera CPU unit 1. Same steps as those in FIG. 4 are omitted to explain.

The flow starts from S100 and then goes to S105. At S105 a position detection signal of focus adjustment optical system (the first lens group 31a of optical system) is input from the focus position detecting portion 4.

Next at S106, a position detection signal of zoom adjustment optical system (the second lens group 31b and the third lens group 31c in optical system) is input from the zoom position detecting portion 33.

At S110, using the both input signals at S105 and S106, values of photographic distance "R", distance "a" between photographic object and front principal plane (H) of photographic optical system, and distance "b" between rear principal plane (H') of photographic optical system and imaging point are selected from the factor storing portion with values in two-dimensional array set in ROM portion in camera CPU unit 1, which are to be used for subsequent calculation.

Steps from S115 are the same as those in FIG. 4.

Incidentally, the method to determine the factors of "R", "a" and "b" used in (Equation 4) or (Equation 5) with the detection outputs of the focus position detecting portion 4 and the zoom position detecting portion 33 is not limited to the method as described to select stored values from the factor storing portion with values in two-dimensional array set in ROM portion in camera CPU unit 1. For example, instead of storing the numerical values of "R", "a" and "b" directly in storing portion in ROM portion in camera CPU unit 1, other values which can determine them by calculation may be stored therein.

In detail, the values may be values of "R", "T" and "b" (obtainable from a=R−b−T) or values obtained by further decomposing "b", i.e., "f (lens focal length,=f)", "x' (distance between image side focal point of lens and photographic film 8)" and "T" (obtainable from b=f'+x', a=f× b/x' and R=a+b+T).

In some zoom lenses, the constant "C" described with (Equation 5) may vary depending upon a relative positional relation between the lens groups.

Also in this case, similarly as other factors, a lens condition may be judged from the detection outputs of the focus position detecting portion 4 and the zoom position detecting portion 33, and a value of "C" may be selected for the condition from the factor storing portion in ROM portion in camera CPU unit 1 to be used in (Equation 5).

Of course, the method to determine the varying factor "C" as described is not limited to use in applications with zoom lens but may be applied to lenses which are of nominal single focus lens.

Although the above example as described is so arranged that the angular velocity "ω" of rotation shakes is calculated from angular velocity signal, that the optical axis change amount "dθ" is then calculated, that a shift amount of correction system is determined by (Equation 4) or (Equation 5), and that the drive of correction system is carried out by controlling the shift amount per predetermined time, the drive control may be arranged directly in dimension of angular velocity "ω" of rotational shakes, as described in above-discussed (Equation 8) or (Equation 9).

In that case, the camera CPU unit 1 may be so arranged as to differentiate the monitor signal sent from the correction drive portion 2 thereto, or the monitor signal itself from the correction drive portion 2 may be arranged to become a signal proportional to the drive speed, such as an output of a tachometer generator.

Also, in the examples of operational sequence described in FIG. 4 or in other figures, whether the switches are in on (closed) state is detected in turn at S125 to S135 so that the flow proceeds to S140 or S145 upon detection of "on" signal, but to S150 with no switch being on. However, two switches could become on at the same time in some photographic circumstances. For example, it may occur if the camera apparatus is fixed on two tripods. In this case, it is highly possible that either of the tripods becomes a real rotation center of shakes, but determining which is a real rotation center is impossible. In addition, an incorrect signal might be generated due to a trouble in switch.

Figure 11:
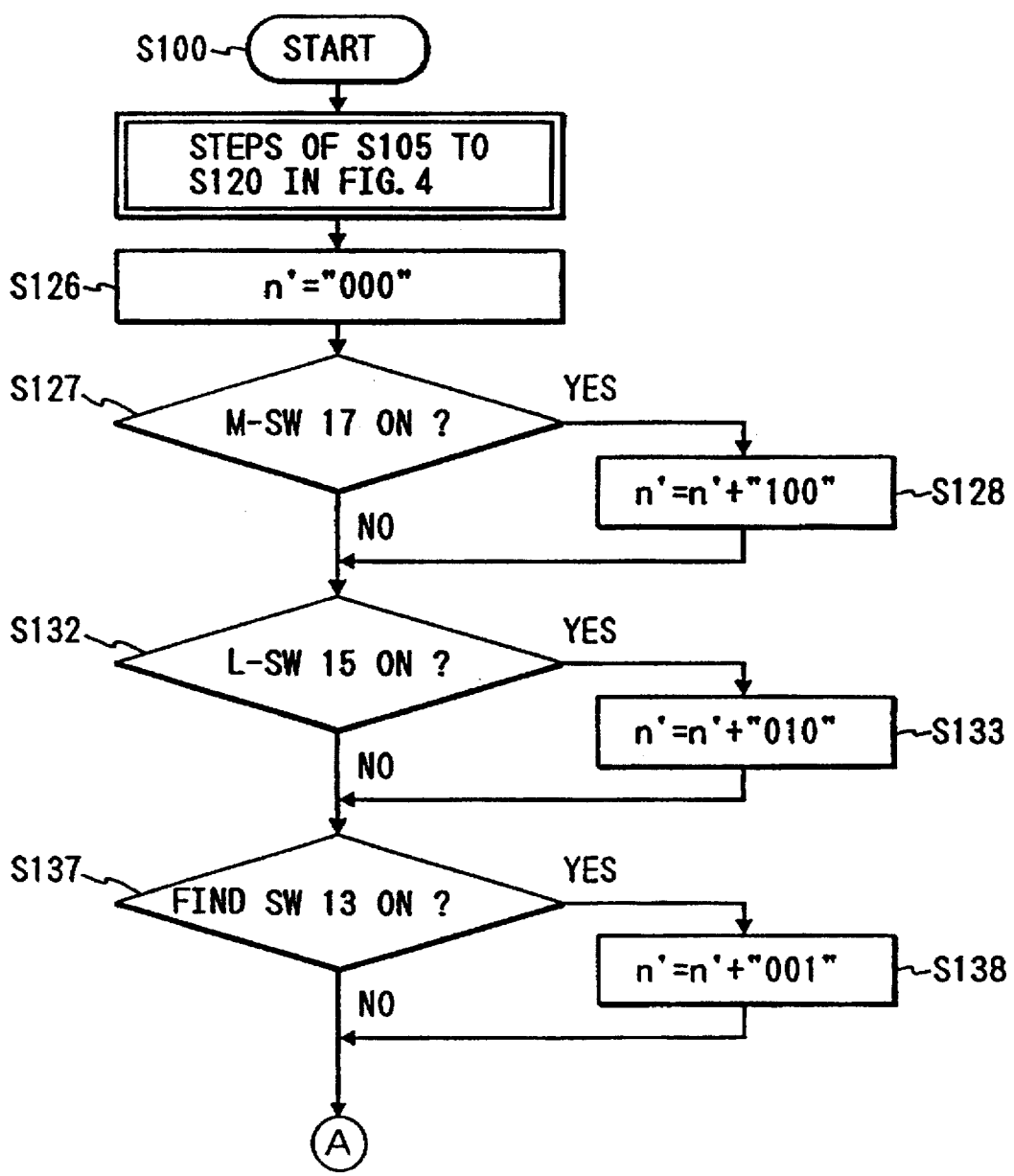
FIG. 11 is a drawing to illustrate the operational sequence in a modification of the present invention.
Figure 12:
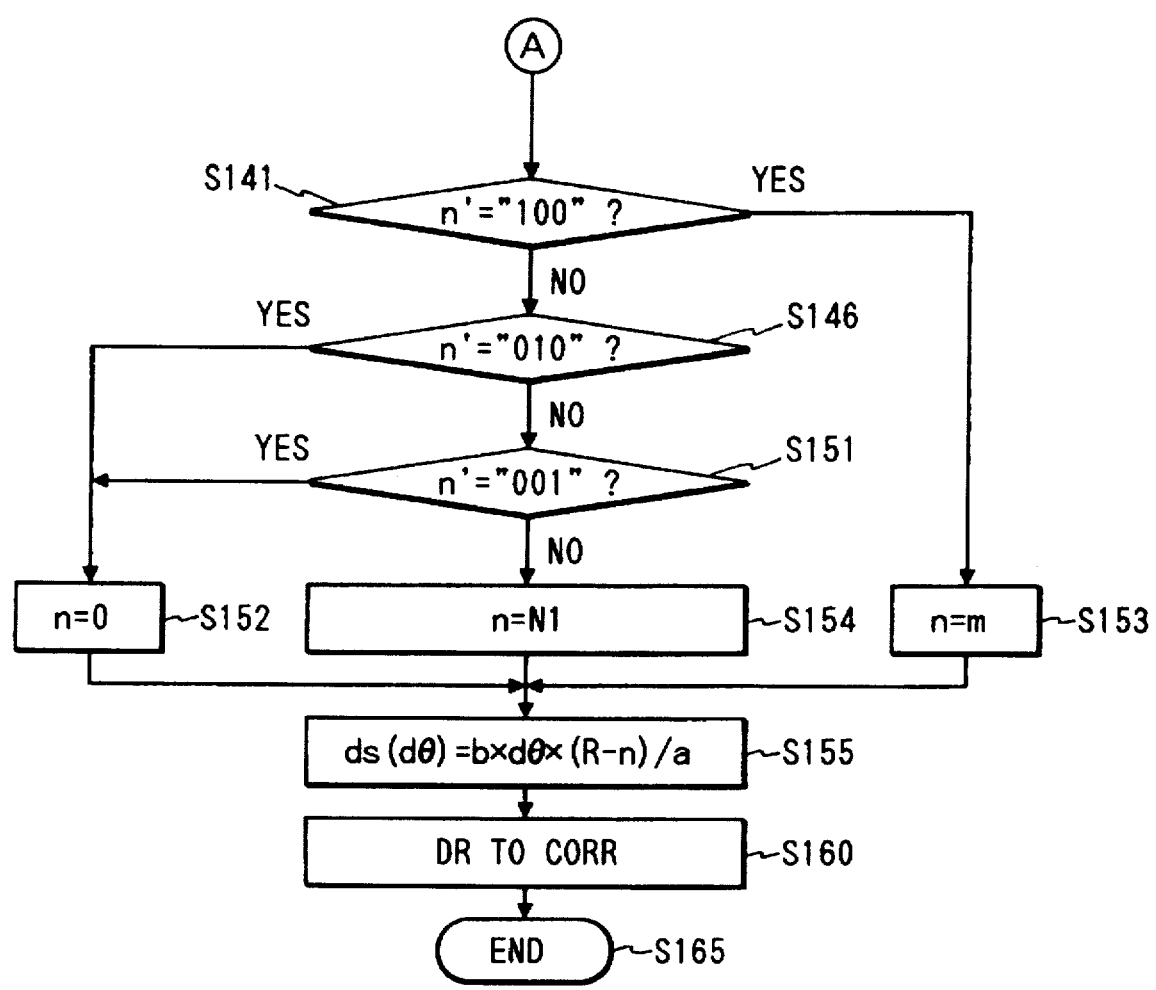
FIG. 12 is a drawing to illustrate the operational sequence in the modification of the present invention.

FIG. 11 and FIG. 12 show an example in which steps S125 to S135 in the example shown in FIG. 4 are modified as steps of S127 to S138 to detect an on state of each switch by adjusting bits in rotation center judging parameter (as shown by n') with change of switch condition. If two or more switches are in on state, the judgement steps of S141 to S151 result in "NO" and then the flow goes to S154. In other words, the image-shake amount is calculated using predetermined factors preliminarily set, if the predetermined conditions are not satisfied.

The predetermined factors may be intermediate values within a range which each factor could take, or values of factors in a circumstance having the highest frequency of photography.

In the example of FIG. 11 and FIG. 12, the value of "n" used if the real rotation center of shakes cannot be determined (in case of the flow reaching S154) is set to "N1" corresponding to the distance between the gravity center of camera apparatus and the photographic film 8. The value of "n" is not limited to this numerical value, of course. As described in the description of FIG. 4, an input dial (not shown) connected to the camera CPU unit 1 may be added to make the value of "n" freely adjustable so that a photographer can adjust the value through dial operation while observing the image through finder so as to effect best correction.

This technique may be also employed when the focus position detecting portion 4 has a trouble and generates an abnormal output.

Figure 13:
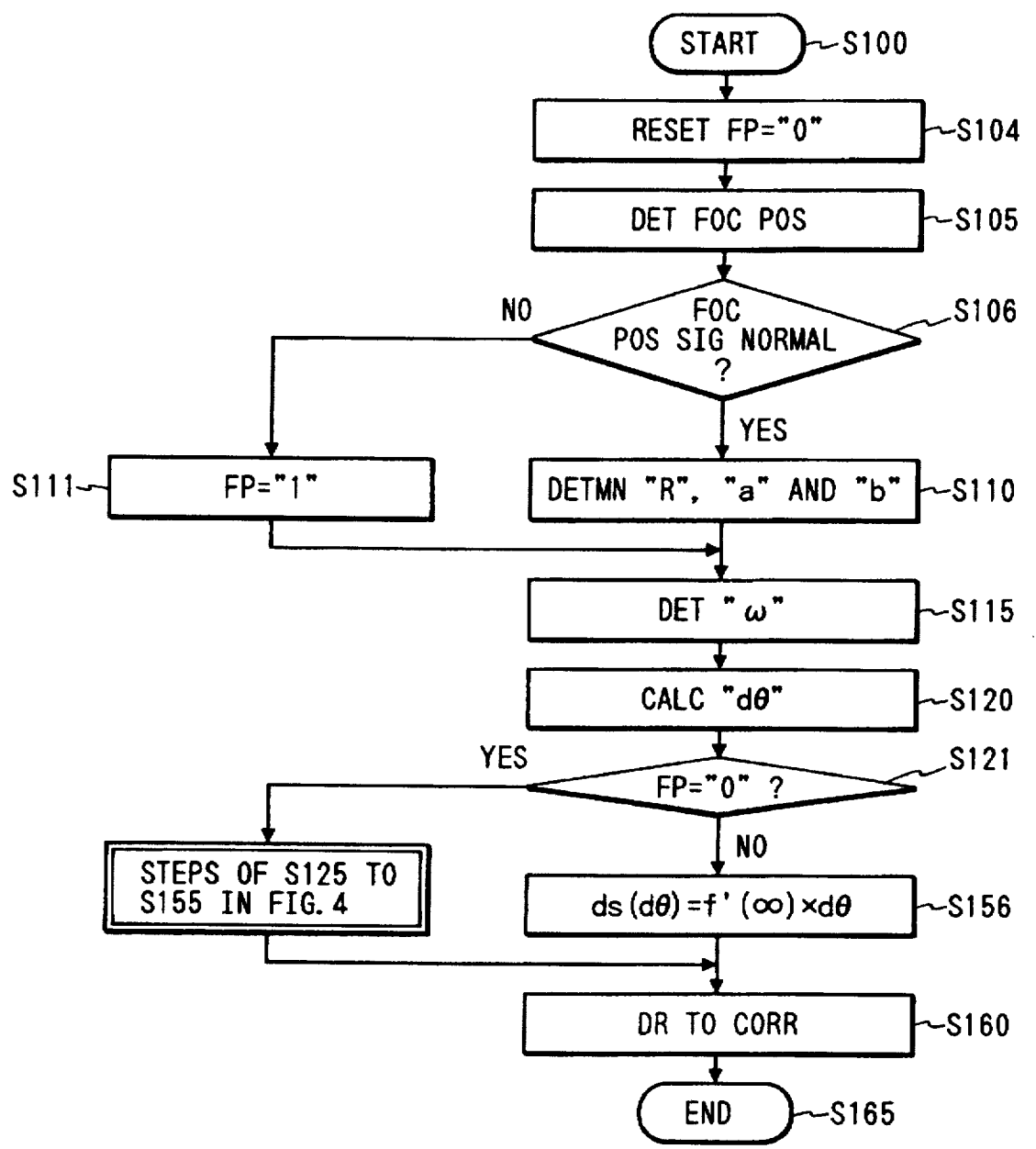
FIG. 13 is a drawing to illustrate the operational sequence in another modification.

FIG. 13 shows an example having a countermeasure against the abnormality of focus position signal. This example is obtained by partly modifying the example shown in FIG. 4, similarly as that in FIG. 11 and FIG. 12.

This example introduces a focus position detection parameter "FP". At S104 the parameter is reset as "FP=0". Then at S105 a detection signal of position of focus adjustment optical system is input from the focus position detecting portion 4 into CPU to detect a current lens condition, similarly as in the example shown in FIG. 4. At next S106 it is judged whether the signal is normal or not. A normal signal means that a signal is within a range which is obtainable in use of system of the present invention. If a signal which is not normal is detected for example because of abnormality in encoder constituting the focus position detecting portion 4 (e.g., ground floating of Gray code brush or the like), the flow goes to S111, judging that the focus position signal is abnormal. If the signal is normal then the flow goes to S110 in the same manner as in the example of FIG. 4.

At S111, the aforementioned focus position detection parameter "FP" is rewritten as "FP=1". Then the flow returns to S115.

After processing of S115 to S120, the value of "FP" is judged at S121.

If the focus position signal is normal with "FP=0", the flow goes through S125–S155 to S160, similarly as in FIG. 4.

If the focus position signal is judged abnormal at S121 with "FP=1", then the flow goes to S156.

"R" is set "infinity" in this example for occurrence of abnormality. Consequently, it may be assumed that R−n=a and b=f'(∞) (focal length at infinity), which can obviate the steps of S125 to S150 and S155.

At S156 the shake correction drive amount is calculated in the above conditions, and then the flow goes to S160.

As described above, according to the present invention, accurate characteristic values of photographic optical system (for example, focal length: f (=f'), optical lens thickness: T, and distance between rear principal plane H' and image plane: b) may be obtained by detecting the condition of photographic optical system in the apparatus of the present invention, so that the image-shake amount may be calculated using the accurate values, whereby obtaining accurate image-shake amount in current photographic condition and enabling high-precision shake correction drive.

Further, determining the rotation center position of optical axis in the apparatus of the present invention by means of switches or sensors permits calculation of more accurate image-shake amount by removing image shakes caused by the rotation of apparatus and also removing the influence caused by the movement of the rotation center position and the incidence portion of photographic lens.

Also, if the apparatus of the present invention further comprises abnormality detecting means for detecting abnormality of output of the means for detecting the rotation center or abnormality detecting means for detecting abnormality of output of the means for detecting the condition of optical system in the apparatus of the present invention, the calculation of image-shake amount can be processed even if the detecting means should have a trouble, which enables in fulfillment of effective shake correction drive.

Figure 14:
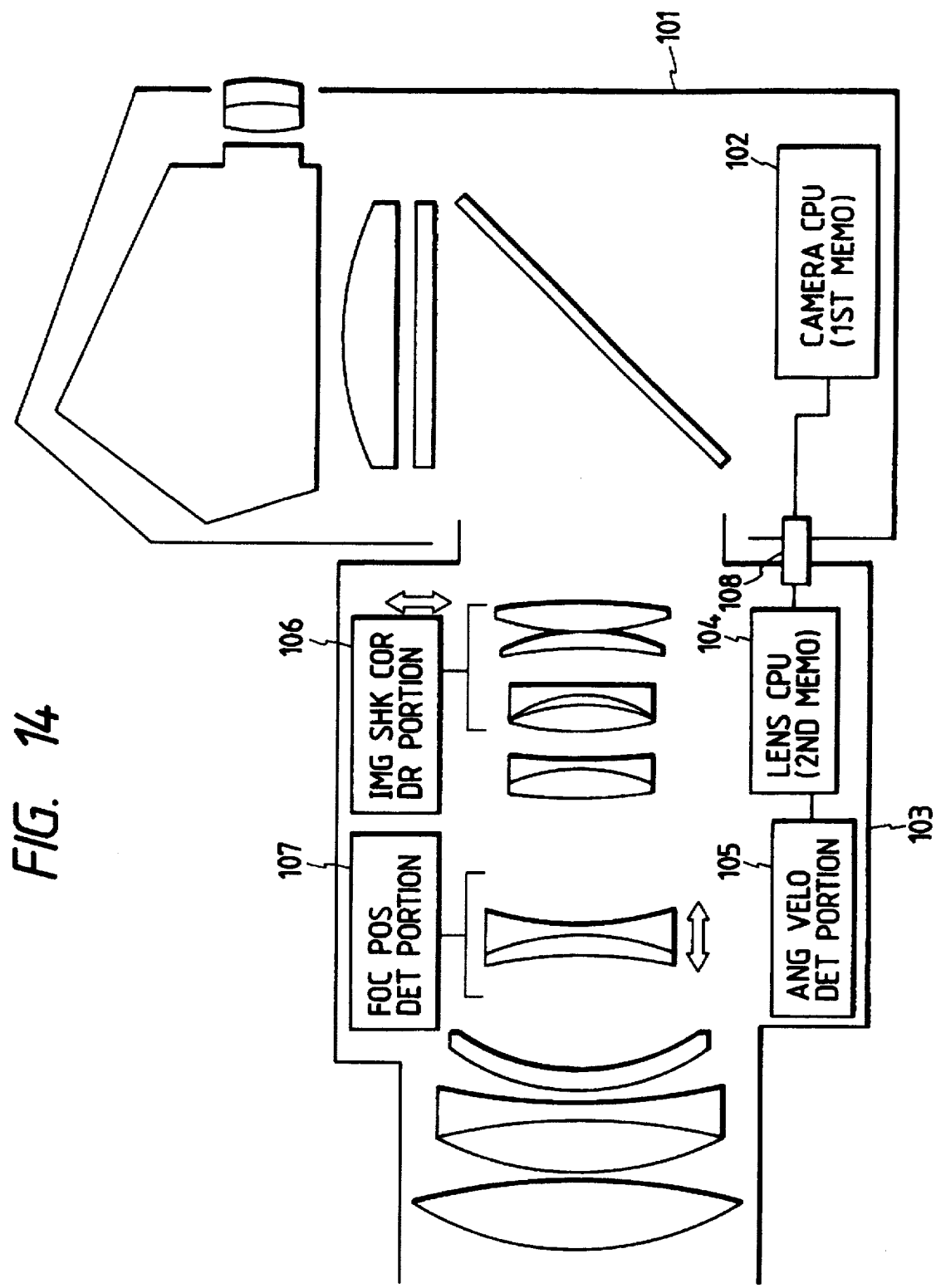
FIG. 14 is a schematic constitutional drawing of an entire camera to which the present invention is suitably applied, showing an embodiment of the image-shake correcting photographic apparatus according to the present invention.
Figure 15:
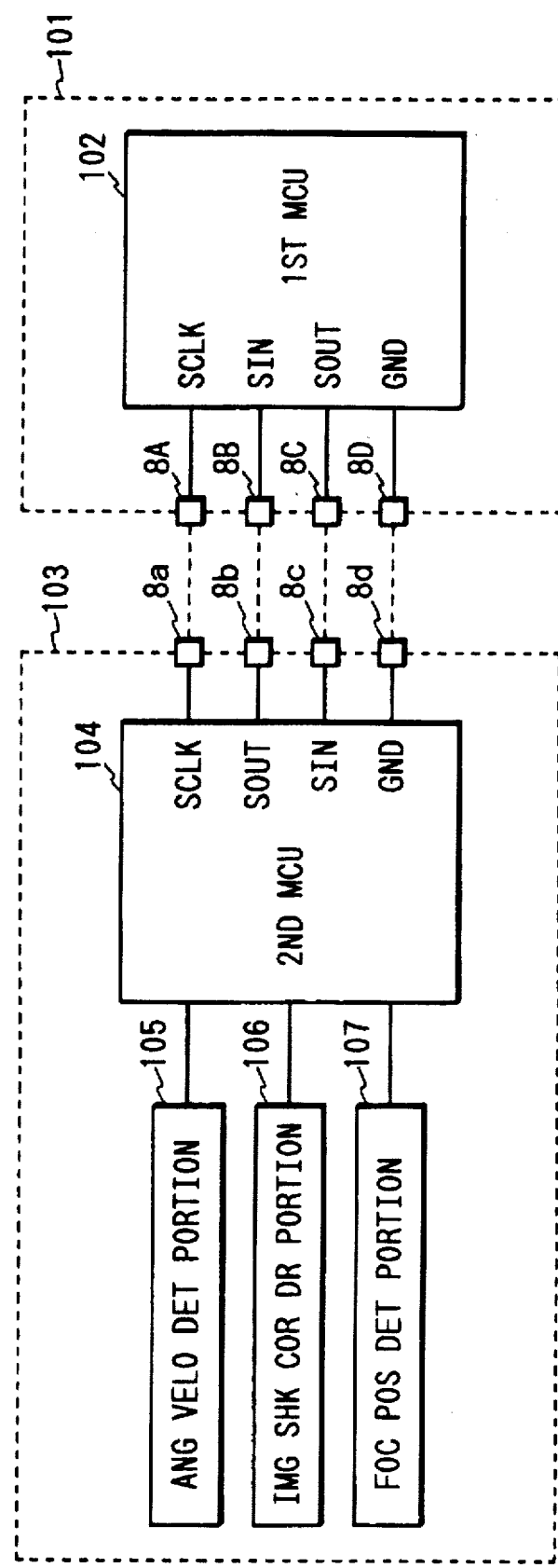
FIG. 15 is a block diagram to illustrate the main structure of the image-shake correcting photographic apparatus according to the present invention.
Figure 16:
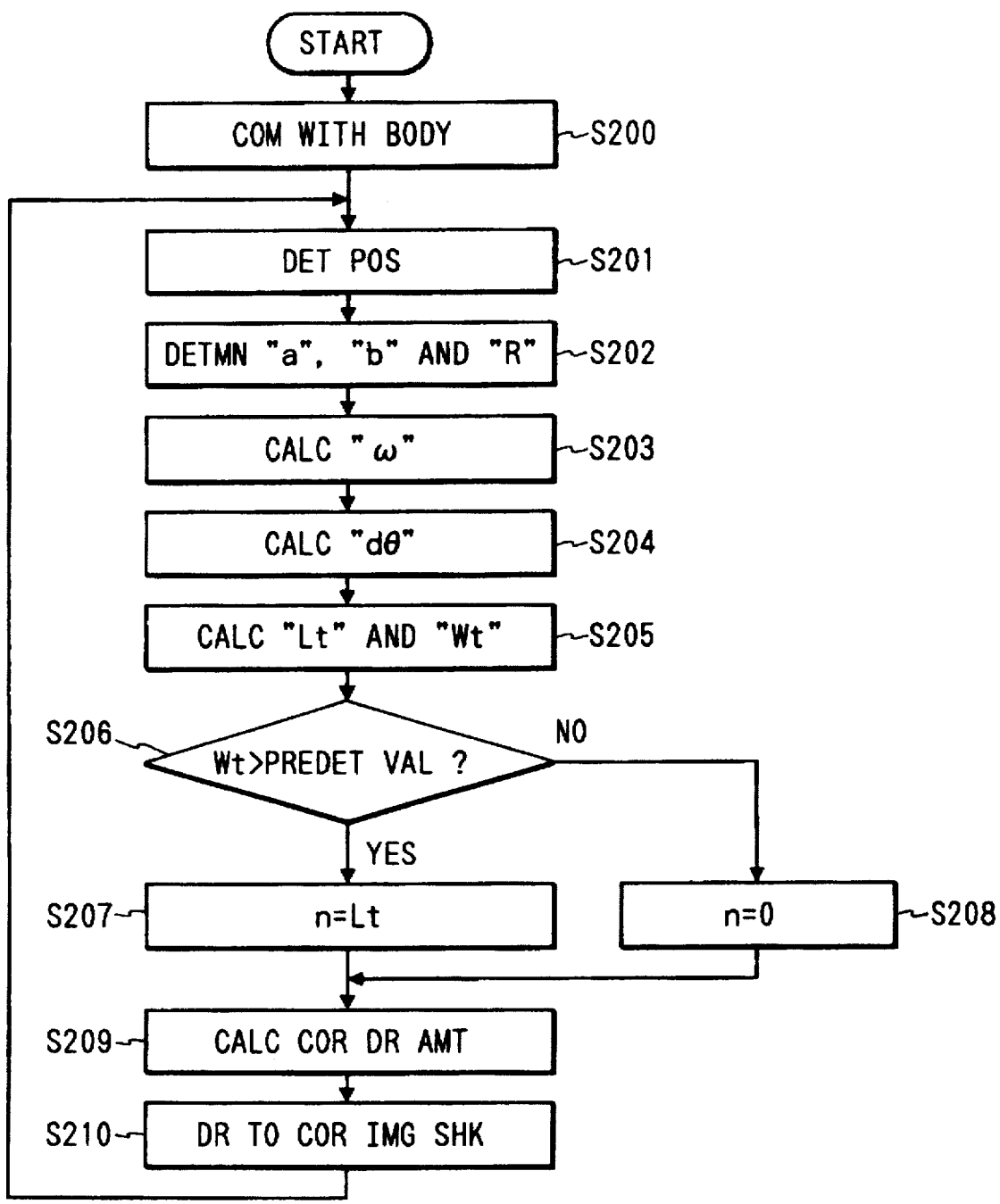
FIG. 16 is a flowchart to illustrate the operational sequence for image-shake correction in the image-shake correcting photographic apparatus according to the present invention.

FIG. 14 to FIG. 16 show an embodiment of an image-shake correcting photographic apparatus according to the present invention. First described with FIG. 14 is the schematic construction of an interchangeable lens camera to which the present invention is suitably applied.

In FIG. 14 reference numeral 101 denotes a camera body. In the camera body 101 there is provided a camera side CPU 102, which may be a one-chip microcomputer (as will be referred to as first MCU). The camera side CPU 102 is arranged to execute various drive controls in camera such as communications with a lens barrel 103, release, exposure, film winding, etc.

Numeral 104 denotes a lens barrel side CPU which is a one-chip microcomputer (as will be referred to as second MCU) provided in the lens barrel lens 103. The lens barrel side CPU is arranged to execute various drive controls of lens, such as communications with the camera body 101, the image-shake correction, etc.

Numeral 105 designates an angular velocity detecting portion provided on the side of lens barrel 103, to detect rotational deviation, which could be a cause of image shakes including the hand shakes, as an angular velocity. This angular velocity detecting portion 105 may be a conventional vibration gyro angular velocity sensor.

Numeral 106 denotes an image-shake correction drive portion for shift-driving an image-shake correction optical system, which is a partial element of photographic optical system disposed in the lens barrel 103, in necessary condition. The image-shake correction drive portion 106 is provided with a monitor portion, which detects a shift amount of correction optical system and sends it as a monitor signal to the second MCU 104.

Numeral 107 represents a focus position detecting portion for detecting a position of focus adjustment optical system in photographic optical system, which is comprised of sensor means such as encoder to read a rotational position of focus cam ring, to detect a focus condition of photographic optical system.

In FIG. 14, numeral 108 represents electric contacts, at which electric connection is made when the camera body 101 is combined with the lens barrel 103 to enable communications between camera body 101 and the lens barrel 103.

The construction of elements other than the elements as described above in the camera body 101 and in the lens barrel 103 is conventional and therefore omitted to explain in detail.

FIG. 15 is a block diagram of control circuit in the camera body 100 and the lens barrel 103 shown in FIG. 14.

The electric contacts 108 are constructed as follows for clock synchronous communication.

In FIG. 15, numerals 8a and 8A are clock terminals (SCLK, SCLK), through which a clock signal is sent from the body 101.

Also, 8b is a data output terminal (SOUT) on the lens barrel 103 side, 8B a data input terminal (SIN) on the body 101 side, 8C a data input terminal (SIN) on the lens barrel 103 side, and 8C a data output terminal (SOUT) on the body 101 side.

Further, 8d and 8D in FIG. 15 represent ground terminals (GND, GND).

As stated, 3 is an explanatory drawing to illustrate a relationship between a shake (change in angle of optical axis) of interchangeable lens camera as image-shake correcting photographic apparatus according to the present invention and an image shake of subject image, as described before.

The following describes how to determine another variable "n" in above-described (Equation 4).

The shakes of photographic apparatus could be caused by hand vibration. It was found by experiments that the rotation center of such vibration varies depending upon the total weight of camera body 101 and the lens barrel 102.

In case of the total weight being light, the camera body 101 is in contact with photographer's face at the viewing window so that the rear end portion of camera body 101 will not move greatly. Therefore, the rotational shakes of photographic apparatus are likely to be rotational shakes about the rotation center near the body viewing window.

In case the total weight being heavy, the rotation center is often at the position of center of gravity of the camera body 101 and the lens barrel 102 because of the weight.

Then, if the weight and the position of gravity center of the camera body 101 and the lens barrel 102 could be determined, the rotation center position of optical axis of photographic apparatus could also be determined.

If the weight of camera body 101 is Wc, the gravity center position of camera body from film plane Lc, the weight of lens barrel 102 Wl, and the gravity center position of lens barrel from film plane Ll, the following (Equation 10) may express a relation between them with the total gravity center position Lt of the camera body 101 and the lens barrel 102.

$$(Ll-Lt) \times Wl = (Lt-Lc) \times Wc \qquad \text{(Equation 10)}$$

From this Equation 10, the total gravity center position Lt may be calculated as follows.

$$Lt = (Ll \times Wl + Lc \times Wc)/(Wc + Wl) \qquad \text{(Equation 11)}$$

If the total weight (Wc+Wl) of camera body 101 and lens barrel 102 is light, n=0 is set because the rotation center is close to the viewing window. In contrast, if the total weight (Wc+Wl) is heavy, n=Lt is set assuming that the rotation center is at the total gravity center position of camera body 101 and lens barrel 102.

Incidentally, the variable "dθ" in above (Equation 4) is determined by (Equation 7) to (Equation 9).

FIG. 16 is a flowchart to illustrate the operational sequence of second MCU 104 concerning the image shake correction in the apparatus of the present embodiment shown in FIG. 14. The calculation of image-shake correction amount is based on the various equations explained above with FIG. 3.

First at Step (as abbreviated S) 200, the second MCU 104 gets into communication with the first MCU 102 to obtain information on weight Wc and gravity center position Lc of camera body through the contacts 8a–8d and 8A–8D.

Then at S201, the position detection signal of focus adjustment optical system is input from the focus position detecting portion 107 in order to detect a current lens condition.

Further at S202, in accordance with the input signal at above S201, values of photographic distance "R", distance "a" between photographic object and lens front principal plane (H) of photographic optical system, and distance "b" between lens rear principal plane (H') of photographic optical system and imaging point are selected from numerical values preliminarily stored in second MCU 104, which are used for the following calculation.

Then at S203, an angular velocity signal output from the angular velocity detecting portion 105 is detected to calculate an angular velocity "ω" of rotational shakes, using a conversion factor between angular velocity signal strength and angular velocity value preliminarily stored in second MCU 104.

Further at S204, a change amount of optical axis "dθ" caused by rotational shakes of photographic apparatus in predetermined time is calculated. The second MCU 104 executes the calculation operation of angular velocity signal every predetermined time (every dt) at S203. The change amount "dθ" is calculated as dθ=ω×dt, as described in above (Equation 9).

The following steps from S205 are for detecting the rotation center of rotational shakes of photographic apparatus.

First at S205, a total weight Wt (=Wc+Wl) and a gravity center position Lt of camera body 101 and lens barrel 102 are calculated from the weight Wc and the gravity center position Lc of camera body 101 obtained at S200 and from the weight Wl and the gravity center position Ll of lens barrel 102 preliminarily stored in second MCU 104.

At S206, it is judged whether the total weight Wt is greater than a predetermined value. If it is greater then n=Lt is set (at S207); if smaller then n=0 is set (at S208).

Further at S209, the calculation of image-shake correction drive amount is carried out using (Equation 4) described before with FIG. 3 (or using (Equation 5) as a general solution).

After that, the flow goes to S210 to control the image-shake correction drive portion 106 to shift-drive the image-shake correction optical system.

After the above steps, the flow returns to S201. The routine of S201 to S210 will be constantly repeated thereafter during execution of image-shake correction drive.

As seen from the above description, the image-shake correcting photographic apparatus in the present embodiment determines from lens condition values of photographic distance "R", distance "a" between photographic object and lens front principal plane (H) of photographic optical system, and distance "b" between lens rear principal plane (H') and imaging point, and further determines the distance "n" between the rotation center point N and imaging point if necessary, so that it may calculate more accurate image-shake amount from rotational shake amount "dθ" of photographic apparatus detected, enabling image-shake correction drive to accurately correct the image-shake amount.

The present invention is not limited to the arrangements of embodiments as described above, and it is needless to mention that many modifications and changes could be made in shape, structure, or the like of elements in image-shake correcting photographic apparatus.

For example, although the embodiment of FIG. 14 shows only the angular velocity detecting portion and the image-shake correction drive portion for vertical shakes, it is clear to skilled people that the apparatus of the embodiment may be modified to correct horizontal shakes (shakes in the direction normal to the sheet plane of FIG. 14) in the same manner as described. Further, an apparatus may be arranged to correct both vertical and horizontal shakes.

As described above, the image-shake correcting photographic apparatus according to the present invention is arranged to comprise image pickup means, a photographic optical system, an image-shake correction drive portion for shifting an image-shake correction optical system, which is a partial element of the photographic optical system, relative to a screen to effect image-shake correction, angle change detecting means for detecting a change in angle of optical axis of photographic apparatus, condition detecting means for detecting a condition of photographic optical system, and an image-shake correction drive control portion for controlling the drive of image-shake correction drive portion in accordance with the output from the angle change detecting means and the output from the condition detecting means, in which the gravity center position and the weight of each of camera body and interchangeable lens barrel constituting the photographic apparatus are stored, the rotation center position is determined by obtaining the total gravity center position of camera body and lens barrel in combination, based on the stored information, and the image-shake correction drive control portion drive-controls the image-shake correction drive portion, based on the thus determined center position, whereby the following advantages may be enjoyed.

In the present invention, accurate characteristic values of photographic optical system (such as focal length: f (=f'), optical lens thickness: T, distance between lens rear principal plane H' and imaging plane: b) may be obtained by detecting the condition of photographic optical system in the photographic apparatus, which could vary depending upon photographic situation, and the image-shake amount may be calculated using the obtained accurate values. Therefore, an accurate image-shake amount may be calculated in current photographic condition so as to enable high-precision image-shake correction drive.

Further, according to the present invention, the rotation center position of optical axis can be determined from the information on weight and gravity center position of camera body and lens barrel constituting the photographic apparatus in any combination of positional condition between camera body and lens barrel. By this, in addition to removal of image shakes caused by rotation of photographic apparatus, the influence caused by movement at rotation center position of photographic apparatus and at incidence portion of photographic lens optical system may also be effectively removed. As a result, more accurate image-shake amount may be calculated so as to enable high-precision image-shake correction drive.

Also, if the image-shake correcting photographic apparatus according to the present invention further comprises calculating means for calculating the total weight of combination of camera body and lens barrel constituting the photographic apparatus and determining means for determining the rotation center of image shakes with the output from the calculating means, the above-described advantages may be further enhanced so that an accurate image-shake amount may be calculated to enable high-precision image-shake correction drive.

What is claimed is:

1. An image-shake correcting photographic apparatus, comprising:

a photographic optical system;

an image-shake correcting device comprised of an element which is a constituent of said photographic optical system;

a condition output device which detects a condition of said photographic optical system upon photography and generates an output related to the condition detected;

a shake detecting device which detects shakes of said photographic apparatus and generates an output related to the shakes detected; and a drive control device which drive-controls said image-shake correcting device, based on the output of the condition output device and the output of the shake detecting device;

wherein said condition output device generates an output determined based on a distance between a front side principal plane and a rear side principal plane of said photographic optical system upon photography.

2. An image-shake correcting photographic apparatus according to claim 1, wherein said condition output means generates an output determined based on a distance between a subject and an image plane of said photographic optical system upon photography.

3. An image-shake correcting photographic apparatus according to claim 1, wherein said shake detecting device comprises an angular velocity sensor.

4. An image-shake correcting photographic apparatus according to claim 1, wherein said condition output device outputs a predetermined, stored value in response to abnormality in condition detection of said photographic optical system upon photography.

5. An image-shake correcting photographic apparatus, comprising:

a photographic optical system;

an image-shake correcting device comprised of an element which is a constituent of said photographic optical system;

a condition output device which detects a condition of said photographic optical system upon photography and generates an output related to the condition detected;

a shake detecting device which detects shakes of said photographic apparatus and generates an output related to the shakes detected; and a drive control device which drive-controls said image-shake correcting device, based on the output of the condition output device and the output of the shake detecting device;

wherein said condition output device generates an output determined based on a distance between an image plane and a rear principal plane of said photographic optical system upon photography.

6. An image-shake correcting photographic apparatus according to claim 4, wherein said shake detecting means generates an output determined based on a change in angle caused by the shakes of said photographic apparatus.

7. An image-shake correcting photographic apparatus according to claim 5, wherein said condition output device outputs a predetermined, stored value in response to abnormality in condition detection of said photographic optical system upon photography.

8. An image-shake correcting photographic apparatus, comprising:
- a photographic optical system;
- an image-shake correcting device comprised of an element which is a constituent of said photographic optical system;
- a condition output device which detects a condition of said photographic optical system upon photography and generates an output related to the condition detected;
- a shake detecting device which detects shakes of said photographic apparatus and generates an output related to the shakes detected; and
- a drive control device which drive-controls said image-shake correcting device, based on the output of the condition output device and the output of the shake detecting device;
- wherein said condition output device generates an output determined based on a distance between a subject and a front principal plane of said photographic optical system upon photography.

9. An image-shake correcting photographic apparatus according to claim 5, wherein said condition output means outputs a predetermined, stored value in response to abnormality in condition detection of said photographic optical system upon photography.

10. An image-shake correcting photographic apparatus according to claim 9, wherein said predetermined, stored value is a value corresponding to a focal length.

11. An image-shake correcting photographic apparatus, comprising:
- a photographic optical system;
- an image-shake correcting device comprised of an element which is a constituent of said photographic optical system;
- a condition output device which detects a condition of said photographic optical system upon photography and generates an output related to the condition detected;
- a shake detecting device which detects shakes of said photographic apparatus and generates an output related to the shakes detected;
- a holding condition judging device which detects a holding condition in which a photographer holds a body of the photographic apparatus, and generates a predetermined output based on the detected condition, said holding condition affecting an amount of image-shake correction to be performed during photographing; and
- a drive control device which drive-controls said image-shake correcting device, based on the output of said condition output device, the output of said shake detecting device, and the output of said holding condition judging device.

12. An image-shake correcting photographic apparatus according to claim 11, wherein said holding condition judging device comprises a detecting device which detects that said body of the photographic apparatus abuts an external object, and generates the predetermined output based on a position of the detecting device in relation to said photographic apparatus.

13. An image-shake correcting photographic apparatus according to claim 11, wherein said holding condition judging device memorizes a predetermined position in relation to said photographic apparatus, and generates the predetermined output based upon the predetermined position.

14. An image-shake correcting photographic apparatus according to claim 11, further comprising an adjusting device capable of adjusting the output generated by said holding condition judging device.

15. An image-shake correcting photographic apparatus according to claim 12, wherein said holding condition judging device generates the predetermined output based on the predetermined position when said detecting device causes a detection error.

16. An image-shake correcting photographic apparatus according to claim 15, wherein said predetermined position is a position of center of gravity of said photographic apparatus.

17. An image-shake correcting photographic apparatus according to claim 13, wherein the predetermined position is the position of a center of gravity of said photographic apparatus.

18. An image-shake correcting photographic apparatus according to claim 13, wherein the predetermined position is the position of an image plane of said photographic apparatus.

19. An image-shake correcting photographic apparatus according to claim 11, wherein said condition output device generates an output determined based on a distance between a front side principal plane and a rear side principal plane of said photographic optical system upon photography.

20. An image-shake correcting photographic apparatus according to claim 11, wherein said condition output device generates an output determined based on a distance between an image plane and a rear principal plane of said photographic optical system upon photography.

21. An image-shake correcting photographic apparatus according to claim 11, wherein said condition output device generates an output determined based on a distance between a subject and a front principal plane of said photographic optical system upon photography.

22. An image-shake correcting photographic apparatus according to claim 11, wherein said shake detecting device comprises an angular velocity sensor.

23. An image-shake correcting photographic apparatus, comprising:
- a photographic optical system;
- an image-shake correcting device comprised of an element which is a constituent of said photographic optical system;
- a condition output device which detects a condition of said photographic optical system upon photography and generates an output related to the condition detected;
- a shake detecting device which detects shakes of said photographic apparatus and generates an output related to the shakes detected;
- a center detecting device which detects and outputs a position of a center of shakes of said photographic apparatus; and a drive control device which drive-controls said image-shake correcting device, based on the output of said condition output device, the output of the shake detecting device, and the output of said center detecting device.

24. An image-shake correcting photographic apparatus according to claim 23, wherein said center detecting device generates an output related to a position of center of gravity of said photographic apparatus.

25. An image-shake correcting photographic apparatus according to claim 23, further comprising an adjusting device which permits the output generated by said center detecting device to be adjusted.

26. An image-shake correcting photographic apparatus according to claim 24, wherein said center detecting device outputs a predetermined, stored value in response to detection of abnormality.

27. An image-shake correcting photographic apparatus according to claim 26, wherein said predetermined, stored value is a value related to the position of center of gravity of said photographic apparatus.

28. An image-shake correcting photographic apparatus according to claim 23, wherein said center detecting device includes a contact detecting device which detects that a body of said photographic apparatus abuts an external object, and said center detecting device generates a predetermined output based on a position of said contact detecting device in relation to said photographic apparatus.

29. An image-shake correcting photographic apparatus according to claim 23, wherein said shake detecting device generates an output determined based on a change in angle caused by the shakes of said photographic apparatus.

30. An image-shake correcting photographic apparatus according to claim 23, wherein said center detecting device comprises a plurality of accelerometers disposed in said photographic apparatus.

31. An image-shake correcting photographic apparatus according to claim 23, wherein said center detecting device generates an output relating to a position of an image plane of said photographic apparatus.

32. An image-shake correcting photographic apparatus according to claim 23, wherein said shake detecting device comprises an angular velocity sensor.

33. An image-shake correcting photographic apparatus, comprising:

a photographic optical system;

an image-shake correcting device which shift-drives a partial element of said photographic optical system in a direction perpendicular to an optical axis;

a condition output device which detects a condition of said photographic optical system upon photography and generates an output related to the condition detected;

a shake detecting device which detects a change in angle caused by shakes of said photographic apparatus and generates an output related to the change in angle detected;

a factor generating device which generates an output related to a condition of shakes of said photographic apparatus; and a drive control device which drive-controls said image-shake correcting device, based on the output of the condition output device, the output of said shake detecting device, and the output of said factor generating device;

wherein said factor generating device generates an output determined based on a relation of relative position between the center of shakes of said photographic apparatus and said photographic apparatus.

34. An image-shake correcting photographic apparatus according to claim 33, wherein said factor generating device generates an output such that the shake center is on an image plane position of said photographic apparatus.

35. An image-shake correcting photographic apparatus according to claim 33, wherein said factor generating device generates an output such that the shake center is on a center of gravity of said photographic apparatus.

36. An image-shake correcting photographic apparatus according to claim 33, wherein said factor generating device generates an output based on a predetermined position previously memorized by said factor generating device.

37. An image-shake correcting photographic apparatus, comprising:

a photographic optical system;

an image-shake correcting device which shift-drives a partial element of said photographic optical system in a direction perpendicular to an optical axis;

a condition output device which detects a condition of said photographic optical system upon photography and generates an output related to the condition detected;

a shake detecting device which detects a change in angle caused by shakes of said photographic apparatus and generates an output related to the change in angle detected;

a factor generating device which generates an output related to a condition of shakes of said photographic apparatus; and a drive control device which drive-controls said image-shake correcting device, based on the output of the condition output device, the output of said shake detecting device, and the output of said factor generating device;

wherein said drive control device drives said image-shake correcting device, based on the following equation:

$$ds(d\theta) = C \times b \times d\theta \times (R-n)/a$$

wherein $ds(d\theta)$: a shift drive amount of said image-shake correcting device per unit time;

C: a constant determined by the condition of said photographic optical system upon photography;

b: a distance between the rear principal plane of said photographic optical system and the image plane;

$d\theta$: an amount of shakes of said photographic apparatus per unit time;

R: a distance between a subject and the image plane;

n: a distance between the center of shakes of said photographic apparatus and the image plane;

a: a distance between the subject and the front principal plane of said photographic optical system.

38. An image-shake correcting photographic apparatus, comprising:

a photographic optical system;

an image-shake correcting device which shift-drives a partial element of said photographic optical system in a direction perpendicular to an optical axis;

a condition output device which detects a condition of said photographic optical system upon photography and generates an output related to the condition detected;

a shake detecting device which detects an angular velocity of shakes of said photographic apparatus and generates an output related to the angular velocity detected;

a factor generating device which generates an output related to a condition of shakes of said photographic apparatus; and a drive control device which drive-controls said image-shake correcting device, based on the output of said condition output device, the output of said shake detecting device, and the output of said factor generating device;

wherein said factor generating device generates an output determined based on a relation of relative position between the center of shakes of said photographic apparatus and said photographic apparatus.

39. An image-shake correcting photographic apparatus according to claim 38, wherein said factor generating device generates an output such that the shake center is on an image plane position of said photographic apparatus.

40. An image-shake correcting photographic apparatus according to claim 38, wherein said factor generating device generates an output such that the shake center is on a center of gravity of said photographic apparatus.

41. An image-shake correcting photographic apparatus according to claim 38, wherein said factor generating device generates an output based on a predetermined position previously memorized by said factor generating device.

42. An image-shake correcting photographic apparatus, comprising:

a photographic optical system;

an image-shake correcting device which shift-drives a partial element of said photographic optical system in a direction perpendicular to an optical axis;

a condition output device which detects a condition of said photographic optical system upon photography and generates an output related to the condition detected;

a shake detecting device which detects an angular velocity of shakes of said photographic apparatus and generates an output related to the angular velocity detected;

a factor generating device which generates an output related to a condition of shakes of said photographic apparatus; and a drive control device which drive-controls said image-shake correcting device, based on the output of said condition output device, the output of said shake detecting device, and the output of said factor generating device;

wherein said drive control device drives said image-shake correcting device, based on the following equation:

$$ds'(\omega)=C\times b\times\omega\times(R-n)/a$$

wherein ds'($\omega$): a velocity of shift drive of said image-shake correcting device;

C: a constant determined by the condition of said photographic optical system upon photography;

b: a distance between the rear principal plane of said photographic optical system and the image plane;

$\omega$: an angular velocity of shakes of said photographic apparatus;

R: a distance between a subject and the image plane;

n: a distance between the center of shakes of said photographic apparatus and the image plane;

a: a distance between the subject and the front principal plane of said photographic optical system.

43. An image-shake correcting photographic apparatus, comprising:

a photographic optical system;

an image-shake correcting device comprised of an element which is a constituent of said photographic optical system;

a condition output device which detects a condition of said photographic optical system upon photography and generates an output related to the condition detected;

abnormality detecting device which detects abnormality of the output of said condition output device;

a shake detecting device which detects shakes of said photographic apparatus and generates an output related to the shakes detected;

a constant generating device which generates an output of predetermined constant; and a drive control device which drive-controls said image-shake correcting device such that unless said abnormality detecting device detects abnormality said image-shake correcting device is drive-controlled based on the output of said condition detecting device and the output of said shake detecting device but if said abnormality detecting device detects abnormality said image-shake correcting device is drive-controlled based on the output of said shake detecting device and the output of said constant generating device replacing the output of said condition output device.

44. An image-shake correcting photographic apparatus according to claim 43, wherein said condition output device generates an output related to the condition of said photographic optical system upon photography.

45. An image-shake correcting photographic apparatus according to claim 43, wherein said condition output device detects a holding condition in which a photographer holds a body of the photographic apparatus, and generates a predetermined output based on the detected condition.

46. An image-shake correcting photographic apparatus according to claim 43, wherein said condition output device generates an output related to a center of shakes of said photographic apparatus.

47. An image-shake correcting photographic apparatus according to claim 43, wherein said shake detecting device comprises an angular velocity sensor.

48. An image-shake correctable photographic apparatus comprised of a lens barrel and a camera body, comprising:

an image pickup device;

a photographic optical system held by said lens barrel;

an image-shake correction drive portion which shifts a partial element of said photographic optical system relative to a screen to effect an image-shake correction;

an angle change detecting device which detects a change in angle of optical axis of said photographic apparatus;

a condition detecting device which detects a condition of said photographic optical system;

a first storing device provided in said camera body, which stores a weight and a position of a center of gravity of said camera body;

a second storing device provided in said lens barrel, which stores a weight and a position of a center of gravity of said lens barrel;

a determining device which determines a position of a center of gravity of a combination of said camera body with said lens barrel, based on outputs from said first and second storing devices; and a control device which drive-controls said image-shake correction drive portion, based on the output of said angle change detecting device, the output of said condition detecting device, and the output of said determining device.

49. An image-shake correctable photographic apparatus according to claim 48, further comprising:

a calculation device which calculates a total weight of the combination of said camera body with said lens barrel; and a determination device which determines a center of rotation of image shakes, based on the output of said calculation device.

50. An image-shake correcting photographic apparatus according to claim 48, wherein said angle change detecting device comprises an angular velocity sensor.

51. A photographic apparatus including a lens barrel and a camera body, comprising:

a first memorizing portion which memorizes information relating to a weight of said camera body;

a second memorizing portion which memorizes information relating to a weight of said lens barrel; and a calculating portion which performs a calculation relating to a weight of said photographic apparatus, based on the information relating to the weights of said camera body and of said lens barrel.

52. A photographic apparatus according to claim 51, further comprising a communicating device which transmits the values between said lens barrel and said camera body.

53. A photographic apparatus according to claim 51, wherein said calculating portion adds the weight of said camera body to the weight of said lens barrel.

54. A photographic apparatus according to claim 51, further comprising a transmission portion which transmit the information of said first memorizing portion and/or said second memorizing portion to said calculating portion.

55. A photographic apparatus according to claim 51, wherein said apparatus comprises detachable units in which said memorizing portions are respectively mounted.

56. A photographic apparatus including a lens barrel and a camera body, comprising:

a first memorizing portion which memorizes information relating to a position of a center of gravity of said camera body;

a second memorizing portion which memorizes information relating to a position of a center of gravity of said lens barrel; and a calculating portion which performs a calculation relating to a position of a center of gravity of said photographic apparatus, based on the information relating to the positions of the centers of gravity of said camera body and of said lens barrel.

57. A photographic apparatus according to claim 56, further comprising a communicating device which transmits the values between said lens barrel and said camera body.

58. A photographic apparatus according to claim 56, wherein said calculating portion calculates the position of the center of gravity of the whole apparatus.

59. A photographic apparatus according to claim 56, further comprising a transmission portion which transmit the information of said first memorizing portion and/or said second memorizing portion to said calculating portion.

60. A photographic apparatus according to claim 56, wherein said first and second memorizing portions respectively memorize weights of said camera body and of said lens barrel, and said calculating portion uses the information relating to the positions of the centers of gravity and of the weights, for calculating.

61. A photographic apparatus according to claim 56, wherein said apparatus comprises detachable units in which said memorizing portions are respectively mounted.

62. An image-shake correcting photographic apparatus, comprising:

a photographic optical system;

an image-shake correcting portion, comprised of an element which is a constituent of said photographic optical system, which provides an image-shake correction;

a shake detecting portion which detects a shake of said photographic apparatus and generates an output relating to the shake detected;

a memorizing portion which memorizes information relating to a weight of said photographic apparatus;

a calculating portion which performs a calculation relating to a weight of said photographic apparatus, based on the information memorized in said memorizing portion; and a correction drive control portion which changes a relationship between the output from said shake detecting portion and a correction amount of said image-shake correcting portion, based on the calculation result, to control a drive of said image-shake correcting portion in accordance with the output from said shake detecting portion.

63. An image-shake correcting photographic apparatus, comprising:

a photographic optical system;

an image-shake correcting portion, comprised of an element which is a constituent of said photographic optical system, which provides an image-shake correction;

a shake detecting portion which detects a shake of said photographic apparatus and generates an output relating to the shake detected;

a memorizing portion which memorizes information relating to a position of a center of gravity of said photographic apparatus; and a calculating portion which performs a calculation relating to a position of a center of gravity of said photographic apparatus, based on the information memorized in said memorizing portion; and a correction drive control portion which changes a relationship between the detected output from said shake detecting portion and a correction amount of said image-shake correcting portion, based on the calculation result, to control a drive of said image-shake correcting portion in accordance with the detected output from said shake detecting portion.

64. An image-shake correcting photographic apparatus including a camera body and a lens barrel detachable therefrom, comprising:

a photographic optical system;

an image-shake correcting portion, comprised of an element which is a constituent of said photographic optical system, which provides an image-shake correction;

a shake detecting portion which detects a shake of said photographic apparatus and generates an output relating to the shake detected;

a first memorizing portion which memorizes body information peculiar to said camera body, including information that affects an amount of image-shake correction to be performed during photographing;

a second memorizing portion which memorizes lens information peculiar to said lens barrel;

a calculating portion which calculates a value based on the information memorized in said first and said second memorizing portions;

a transmission portion which transmits the information memorized in said first and/or said second memorizing portions to said calculating portion; and a correction drive control portion which changes a relationship between the detected output from said shake detecting portion and a correction amount of said image-shake correcting portion, based on the value calculated by said calculating portion, to control a drive of said image-shake correcting portion in accordance with the detected output from said shake detecting portion.

65. A photographic apparatus according to claim 64, wherein the body information and the lens information include at least one of weights, and positions of center of gravity, of said camera body and said lens barrel.

66. An image-shake correcting photographic apparatus according to claim 64, wherein said apparatus comprises detachable units in which said memorizing portions are respectively mounted.

67. An image-shake correcting photographic apparatus according to claim 64, wherein said transmission portion transmits through an electrical connection between said camera body and said lens barrel.

68. An image-shake correcting photographic apparatus according to claim 64, wherein said transmission portion includes a first transmission line which transmits information from said lens barrel to said camera body, and a second transmission line which transmits information from said lens barrel to said camera body.

69. A photographic apparatus including a lens barrel and a camera body, wherein said camera body comprises a memorizing portion which memorizes body information particular to said camera body and outputs the body information in accordance with a request and a communicating portion which transmits the body information to said lens barrel; and said lens barrel comprises a photographic optical system; an image-shake correcting device comprised of an element which is a constituent of said photographic optical system; a condition output device which detects a condition of said photographic optical system upon photography and generates an output related to the condition detected; a shake detecting device which detects shakes of said photographic apparatus and generates an output related to the shakes detected; a communicating portion which inputs the body information; a memorizing portion which memorizes lens information particular to said lens barrel and outputs the lens information in accordance with a request; a calculating device which calculates and outputs a factor based on the body information and the lens information, said factor affecting an amount of image-shake correction to be performed during photographing; and a drive control device which drive-controls said image-shake correcting device, based on the output of said condition output device, the output of said shake detection device, and the output of said calculating device.

70. A photographic apparatus according to claim 69, wherein the body information and the lens information include at least one of weights, and positions of center of gravity, of said camera body and said lens barrel.

71. An image-shake correcting method of a photographic apparatus comprising the steps of:

detecting a condition of a photographic optical system of said photographic apparatus upon photography, and generating an output related to the condition detected, based on a distance between a front side principal plane and a rear side principal plane of said photographic optical system upon photography;

detecting shakes of said photographic apparatus and generating an output related to shakes detected; and drive-controlling an image-shake correcting device comprised of an element which is a constituent of said photographic optical system, based on the output related to the condition detected and the output related to the shakes detected.

72. An image-shake correcting method of a photographic apparatus comprising the steps of:

detecting a condition of a photographic optical system of said photographic apparatus upon photography, and generating an output related to the condition detected, based on a distance between an image plane and a rear side principal plane of said photographic optical system upon photography;

detecting shakes of said photographic apparatus and generating an output related to shakes detected; and drive-controlling an image-shake correcting device comprised of an element which is a constituent of said photographic optical system, based on the output related to the condition detected and the output related to the shakes detected.

73. An image-shake correcting method of a photographic apparatus comprising the steps of:

detecting a condition of a photographic optical system of said photographic apparatus upon photography, and generating an output related to the condition detected, based on a distance between a subject and a front side principal plane of said photographic optical system upon photography;

detecting shakes of said photographic apparatus and generating an output related to shakes detected; and drive-controlling an image-shake correcting device comprised of an element which is a constituent of said photographic optical system, based on the output related to the condition detected and the output related to the shakes detected.

74. An image-shake correcting method of a photographic apparatus comprising the steps of:

detecting a condition of a photographic optical system of said photographic apparatus upon photography, and generating an output related to the condition detected;

detecting shakes of said photographic apparatus and generating an output related to shakes detected;

detecting a holding condition in which a photographer holds a body of the photographic apparatus, and generating a predetermined output based on the detected condition, said holding condition affecting an amount of image-shake correction to be performed during photographing; and drive-controlling an image-shake correcting device comprised of an element which is a constituent of said photographic optical system, based on the output related to the condition detected, the output related to the shakes detected, and the predetermined output based on the holding condition.

75. An image-shake correcting method of a photographic apparatus comprising the steps of:

detecting a condition of a photographic optical system of said photographic apparatus upon photography, and generating an output related to the condition detected;

detecting shakes of said photographic apparatus and generating an output related to shakes detected;

detecting and outputting a position of a center of shakes of said photographic apparatus; and drive-controlling an image-shake correcting device comprised of an element which is a constituent of said photographic optical system, based on the output related to the condition detected, the output related to the shakes detected, and the output of the position of the center.

76. An image-shake correcting method of a photographic apparatus comprising the steps of:

detecting a condition of a photographic optical system of said photographic apparatus upon photography, and generating an output related to the condition detected;

detecting a change in angle caused by shakes of said photographic apparatus and generating an output related to the change in angle detected;

generating an output related to a condition of shakes of said photographic apparatus, determined based on a relation of relative position between the center of shakes of said photographic apparatus and said photographic apparatus; and drive-controlling a partial element of said photographic optical system in a direction perpendicular to an optical axis, based on the output related to the condition detected, the output related to the change in angle detected, and the output related to the condition of shakes.

77. An image-shake correcting method of a photographic apparatus comprising the steps of:

detecting a condition of a photographic optical system of said photographic apparatus upon photography, and generating an output related to the condition detected;

detecting a change in angle caused by shakes of said photographic apparatus and generating an output related to the change in angle detected;

generating an output related to a condition of shakes of said photographic apparatus; and drive-controlling an image-shake correcting device comprised of an element which is a constituent of said photographic optical system, based on the output related to the condition detected, the output related to the shakes detected, and the output related to the condition of shakes, and based on the following equation:

$$ds(d\theta) = C \times b \times d\theta \times (R-n)/a$$

wherein ds(dθ): a shift drive amount of said image-shake correcting device per unit time;

C: a constant determined by the condition of said photographic optical system upon photography;

b: a distance between the rear principal plane of said photographic optical system and the image plane;

dθ: an amount of shakes of said photographic apparatus per unit time;

R: a distance between a subject and the image plane;

n: a distance between the center of shakes of said photographic apparatus and the image plane;

a: a distance between the subject and the front principal plane of said photographic optical system.

78. An image-shake correcting method of a photographic apparatus comprising the steps of:

detecting a condition of a photographic optical system of said photographic apparatus upon photography, and generating an output related to the condition detected;

detecting an angular velocity of shakes of said photographic apparatus and generating an output related to the angular velocity detected;

generating an output related to a condition of shakes of said photographic apparatus, determined based on a relation of relative position between the center of shakes of said photographic apparatus and said photographic apparatus; and drive-controlling a partial element of said photographic optical system in a direction perpendicular to an optical axis, based on the output related to the condition detected, the output related to the angular velocity detected, and the output related to the condition of shakes.

79. An image-shake correcting method of a photographic apparatus comprising the steps of:

detecting a condition of a photographic optical system of said photographic apparatus upon photography, and generating an output related to the condition detected;

detecting an angular velocity of shakes of said photographic apparatus and generating an output related to the angular velocity detected;

generating an output related to a condition of shakes of said photographic apparatus; and drive-controlling an image-shake correcting device comprised of an element which is a constituent of said photographic optical system, based on the output related to the condition detected, the output related to the shakes detected, and the output related to the condition of shakes, and based on the following equation:

$$ds'(\omega) = C \times b \times d\theta \times (R-n)/a$$

wherein ds'(ω): a velocity of shift drive of said image-shake correcting device;

C: a constant determined by the condition of said photographic optical system upon photography;

b: a distance between the rear principal plane of said photographic optical system and the image plane;

ω: an angular velocity of shakes of said photographic apparatus;

R: a distance between a subject and the image plane;

n: a distance between the center of shakes of said photographic apparatus and the image plane;

a: a distance between the subject and the front principal plane of said photographic optical system.

80. An image-shake correcting method of a photographic apparatus comprising the steps of:

detecting a condition of a photographic optical system of said photographic apparatus upon photography, and generating an output related to the condition detected;

detecting abnormality of the output of the condition detected;

detecting shakes of said photographic apparatus and generating an output related to the shakes detected;

generating an output of predetermined constant; and drive-controlling an image-shake correcting device comprised of an element which is a constituent of said photographic optical system, based on the output related to the condition detected and the output related to the shakes detected unless the abnormality is detected, and based on the output of predetermined constant replacing the output related to the condition detected, and the output related to the shakes detected if the abnormality is detected.

81. An image-shake correcting method of a photographing apparatus including a lens barrel and a camera body, comprising the steps of:

detecting a change in angle of optical axis of said photographic apparatus;

detecting a condition of a photographic optical system of said photographic apparatus;

storing a weight and a position of a center of gravity of said camera body;

storing a weight and a position of a center of gravity of said lens barrel;

determining a position of a center of gravity of a combination of said camera body with said lens barrel, based on the stored weights and the stored positions of the centers of gravity of said camera body and said lens barrel; and drive-controlling a part of said photographic optical system which is held in said lens barrel, to a screen, based on the detected change in angle, the detected condition, and determined position of the center of gravity, thereby to perform an image-shake correction.

82. An image-shake correcting method of a photographing apparatus including a lens barrel and a camera body, comprising the steps of:

memorizing information relating to a weight of said camera body;

memorizing information relating to a weight of said lens barrel; and performing a calculation relating to a weight of said photographic apparatus, based on the information relating to the weights of said camera body and said lens barrel.

83. An image-shake correcting method of a photographing apparatus including a lens barrel and a camera body, comprising the steps of:

memorizing information relating to a position of a center of gravity of said camera body;

memorizing information relating to a position of a center of gravity of said lens barrel; and performing a calculation relating to a position of a center of gravity of said photographic apparatus, based on the information relating to the positions of the centers of gravity of said camera body and said lens barrel.

84. An image-shake correction method of a photographic apparatus, comprising:

detecting a shake of said photographic apparatus and generating an output relating to the shake detected;

memorizing information relating to a weight of said photographic apparatus;

performing a calculation relating to a weight of said photographic apparatus, based on the memorized information; and changing a relationship between the output relating to the shake detected and an image-shake correction amount, based on the result of the calculation, and controlling a drive of an image-shake correcting portion, comprised of an element which is a constituent of an optical system of said photographic apparatus, in accordance with the output relating to the shake detected.

85. An image-shake correction method of a photographic apparatus, comprising:

detecting a shake of said photographic apparatus and generating an output relating to the shake detected;

memorizing information relating to a position of a center of gravity of said photographic apparatus;

performing a calculation relating to a position of a center of gravity of said photographic apparatus, based on the memorized information; and changing a relationship between the output relating to the shake detected and an image-shake correction amount, based on the result of the calculation, and controlling an image-shake correcting portion, comprised of an element which is constituent of an optical system of said photographic apparatus, in accordance with the output relating to the shake detected.

86. An image-shake correction method of a photographic apparatus including a camera body and a lens barrel detachable therefrom, comprising:

detecting a shake of said photographic apparatus and generating an output relating to the shake detected;

memorizing body information peculiar to said camera body, including information that affects an amount of image-shake correction to be performed during photographing;

memorizing lens information peculiar to said lens barrel;

calculating a value based on the memorized body information and lens information; and changing a relationship between the output relating to the shake detected and an image-shake correction amount, based on the result of the calculation, and controlling to drive an image-shake correcting portion, comprised of an element which is constituent of an optical system of said photographic apparatus, in accordance with the output relating to the shake detected.

87. An image-shake correction method of a photographic apparatus including a camera body and a lens barrel, comprising:

memorizing body information peculiar to said camera body and outputting the body information in accordance with a request;

transmitting the body information to said lens barrel;

detecting a condition of a photographic optical system of said photographic apparatus, and generating an output related to the detected condition;

detecting shakes of said photographic apparatus, and generating an output related to the shakes detected;

inputting the body information;

memorizing lens information peculiar to said lens barrel and outputting the lens information in accordance with a request;

calculating and outputting a factor based on the body information and the lens information, said factor affecting an amount of image-shake correction to be performed during photographing; and drive-controlling an image-shake correction device comprised of an element which is constituent of an optical system of said photographic apparatus, based on the output related to the condition, the output related to the shakes detected, and the result of the calculation.

* * * * *